US008523670B2

(12) United States Patent
Walker et al.

(10) Patent No.: US 8,523,670 B2
(45) Date of Patent: *Sep. 3, 2013

(54) SYSTEMS AND METHODS FOR DETERMINING A LEVEL OF REWARD

(75) Inventors: Jay S. Walker, Ridgefield, CT (US); Geoffrey M. Gelman, Boston, MA (US); James A. Jorasch, New York, NY (US); Stephen C. Tulley, Fairfield, CT (US); Steven M. Santisi, Ridgefield, CT (US); Daniel E. Tedesco, Huntington, CT (US); Magdalena M. Fincham, Ridgefield, CT (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/352,000

(22) Filed: Jan. 17, 2012

(65) Prior Publication Data

US 2012/0115604 A1 May 10, 2012

Related U.S. Application Data

(63) Continuation of application No. 12/824,787, filed on Jun. 28, 2010, now Pat. No. 8,105,157, which is a continuation of application No. 10/968,342, filed on Oct. 18, 2004, now Pat. No. 7,780,525.

(60) Provisional application No. 60/512,592, filed on Oct. 17, 2003.

(51) Int. Cl.
*A63F 13/00* (2006.01)

(52) U.S. Cl.
USPC .................................. 463/29; 463/25; 463/42

(58) Field of Classification Search
USPC .................... 463/16, 20, 42; 705/39, 41, 14, 705/27; 709/201, 207; 710/105
See application file for complete search history.

(56) References Cited

U.S. PATENT DOCUMENTS

| | | | |
|---|---|---|---|
| 5,761,647 | A | 6/1998 | Boushy |
| 6,431,983 | B2 | 8/2002 | Acres |
| 6,910,964 | B2 | 6/2005 | Acres |
| 7,001,278 | B2 | 2/2006 | Maya et al. |
| 7,025,674 | B2 | 4/2006 | Adams et al. |

(Continued)

FOREIGN PATENT DOCUMENTS

| | | |
|---|---|---|
| JP | H10-277256 | 10/1998 |
| JP | 2001-104539 | 4/2001 |
| JP | 2002-11251 A | 1/2002 |
| JP | 2002-177630 | 6/2002 |

OTHER PUBLICATIONS

Letter from Marvin A. Motsenbocker of Mots Law dated Jul. 17, 2012 regarding Third Party Submission in Published Application Under 37 C.F.R. 1.99 filed for U.S. Appl. No. 13/352,008 (1 page).

(Continued)

*Primary Examiner* — Masud Ahmed
(74) *Attorney, Agent, or Firm* — Neal, Gerber & Eisenberg LLP

(57) ABSTRACT

A gaming system and method which includes enabling a first player at a first gaming device to initiate at least one play of a first game, enabling a second player at a second gaming device to initiate at least one play of a second game, determining, based at least in part on at least one activity of the first player, a benefit, and providing the determined benefit to the second player.

14 Claims, 13 Drawing Sheets

(56) References Cited

U.S. PATENT DOCUMENTS

| | | | |
|---|---|---|---|
| 2002/0055386 | A1 | 5/2002 | Yotsugi et al. |
| 2002/0169021 | A1 | 11/2002 | Urie et al. |
| 2003/0148807 | A1 | 8/2003 | Acres |
| 2003/0207713 | A1 | 11/2003 | Taylor |
| 2004/0072615 | A1 | 4/2004 | Maya et al. |
| 2004/0102238 | A1 | 5/2004 | Taylor |
| 2004/0219971 | A1 | 11/2004 | Ciancio et al. |
| 2005/0014558 | A1 | 1/2005 | Estey |

OTHER PUBLICATIONS

Third Party Submission in Published Application Under 37 C.F.R. 1.99 filed for U.S. Appl. No. 13/352,008, dated Jul. 17, 2012 (3 pages).

Partially highlighted U.S. Patent Application Publication No. 2002/0055386 submitted with Third Party Submission in Published Application Under 37 C.F.R. 1.99 for U.S. Appl. No. 13/352,008 (2 pages).

English translation of paragraphs [0003] and [0004] of JP2002-11251A submitted with Third Party Submission in Published Application Under 37 C.F.R. 1.99 for U.S. Appl. No. 13/352,008 (1 page).

Website: "betmaxcasino.com/Bet Max Casino". (http www betmaxcasino com/), copyright 2002-2003.

Dancer, Bob and Compton, Jeffrey, "Three casinos form new players club", Las Vegas Review—Journal, Jan. 31, 2003, Section: J, p. 6J.

Dancer, Bob and Compton Jeffrey, "Arizona Charlie's continues popular promotion", Las Vegas Review—Journal, Mar. 7, 2003, Section: J, p. 6J.

Brochure: "Introducing iView", Bally Gaming Systems, Copyright 2004.

Third Party Submission in Published Application Under 37 C.F.R. § 1.99 filed for U.S. Appl. No. 13/352,000, dated Jul. 9, 2012 (2 pages).

English translation of paragraph [0013] of JP2001-104539 submitted with Third Party Submission in Published Application Under 37 C.F.R. § 1.99 for U.S. Appl. No. 13/352,000 (1 page).

English translation of paragraph [0083] of JP2002-177630 submitted with Third Party Submission in Published Application Under 37 C.F.R. § 1.99 for U.S. Appl. No. 13/352,000 (1 page).

English translation of paragraph [0004] of JPH10-277256 submitted with Third Party Submission in Published Application Under 37 C.F.R. § 1.99 for U.S. Appl. No. 13/352,000 (1 page).

500

| PLAYER IDENTIFIER 510 | PLAYER NAME 520 | FINANCIAL ACCOUNT IDENTIFIER 530 | REWARD POINTS 540 | REWARD POINT RATE 550 | THEORETICAL WIN / (LOSS) 560 | ACTUAL WIN / (LOSS) 570 |
|---|---|---|---|---|---|---|
| 01270319 | BOB SMITH | ACCT 99 003 | 4,683 | B | $3,512 | $4,209 |
| 11285739 | JIM RED | 5424 5555 8910 3218 VISA - 03/2005 | 376 | C | $282 | ($87) |
| 41298800 | JOE GREEN | 99 818 5555 | 17,069 | A | $12,802 | $10,090 |

FIG. 5

600

| GAMING DEVICE IDENTIFIER 610 | GAMING DEVICE TYPE 620 | GAMING DEVICE LOCATION 630 |
|---|---|---|
| G-10G-3998-42 | VIDEO BLACKJACK | CASINO 1, AREA B-3 |
| G-20-0013-55 | VIDEO POKER | CASINO 1, AREA C-1 |
| G-20-9981-03 | VIDEO SLOT - REEL | CASINO 1, AREA C-1 |
| G-50-7712-99 | PHYSICAL REEL SLOT | CASINO 2, AREA B-7 |

FIG. 6

700

| PLAY SESSION IDENTIFIER 710 | PLAYER IDENTIFIER 720 | START TIME 730 | END TIME 740 | SESSION STATUS 750 | CURRENT GAMING DEVICE 760 | CURRENT REWARD POINT RATE 770 | CURRENT RATE OF PLAY 780 | REWARD POINTS EARNED 790 |
|---|---|---|---|---|---|---|---|---|
| PS-4601321 | P-99-0413 | 10:04 AM 10/3/04 | - | IN PROGRESS | G-20-0013-55 | 0.1 POINT / GAME PLAY | 300 PLAYS PER HOUR | 14.3 |
| PS-4601322 | P-02-7180 | 10:05 AM 10/3/04 | - | ON HOLD | - | 0.5 POINT / 30 MINS. | - | 8.5 |
| PS-4601323 | - | 10:06 AM 10/3/04 | 12:07 PM 10/3/04 | OVER | - | 1.0 POINT / GAME PLAY | - | 33 |

FIG. 7

SYSTEMS AND METHODS FOR DETERMINING A LEVEL OF REWARD

PRIORITY CLAIM

This application is a continuation application of, claims the benefit of and priority to U.S. patent application Ser. No. 12/824,787, filed on Jun. 28, 2010, which issued as U.S. Pat. No. 8,105,157 on Jan. 31, 2012, which is a continuation application of, claims the benefit of and priority to U.S. patent application Ser. No. 10/968,342, filed on Oct. 18, 2004, now U.S. Pat. No. 7,780,525, which claims the benefit of and priority to U.S. Provisional Patent Application No. 60/512,592, filed on Oct. 17, 2003, the entire contents of each are incorporated by reference herein.

CROSS REFERENCE TO RELATED APPLICATIONS

This application relates to the following co-pending commonly owned patent applications: "SYSTEMS AND METHODS FOR DETERMINING A LEVEL OF REWARD," Ser. No. 13/352,008.

BACKGROUND

A casino's profits depend upon players visiting the casino and gambling in the casino or otherwise spending money in the casino. Thus, the profits of a casino may be increased, for example, by encouraging a player to remain longer in a casino, remain gambling longer (e.g., at a gaming device), return to the casino and/or to return to gambling at the casino.

Accordingly, a need exists for effective methods of encouraging a player to continue to perform or return to performing an activity beneficial to a casino.

BRIEF DESCRIPTION OF THE DRAWINGS

FIG. 5 is a table illustrating an example structure of a player database, in accordance with one or more embodiments of the present invention.

FIG. 6 is a table illustrating an example structure of a gaming device database, in accordance with one or more embodiments of the present invention.

FIG. 7 is a table illustrating an example structure of a player session database, in accordance with one or more embodiments of the present invention.

DETAILED DESCRIPTION

Figure 1A:
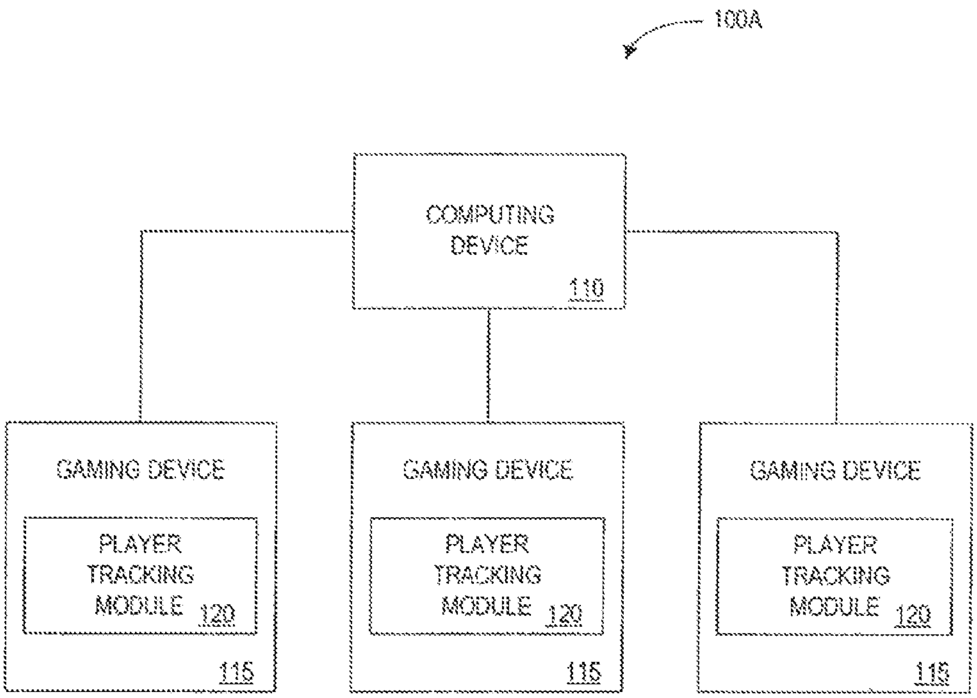
FIG. 1A is a block diagram of an example system, in accordance with one or more embodiments of the present invention.

Applicants have recognized that the longer a player remains on casino premises playing a game or otherwise spending money, the more the casino benefits. This is because, for example, the casino has an expectation to win money on every game play of a game. Further, Applicants have recognized that whenever a player stops playing a game, there is a chance the player may not return to playing a game and may even leave the casino premises. Accordingly, a need exists for an effective method of encouraging a player to remain on casino premises, remain playing a game or return to a casino or to playing a game or otherwise spending money at a casino.

Applicants have further recognized that, in accordance with an aspect of human psychology, once a person has qualified for a reward of a higher than standard level as a result of efforts invested (or has otherwise effectively earned "equity" in the reward), the person is more likely to continue to exert effort to maintain the earned level of reward (or to qualify for a still higher level of reward) than a person who has not exerted such efforts towards qualifying for the higher than standard level of reward in the first place. For example, a person who is simply given a higher level of reward, without having to invest efforts in order to qualify therefore, does not feel a sense of investment in the higher level of reward. Thus, such a person is less likely to exert further effort to maintain the level of reward.

Reward points programs are a common method for a casino to reward players by awarding points to players as a reward for certain gambling behavior that a casino finds desirable. Although the reward points programs differ from casino to casino, in a typical reward point program a player accumulates reward points based on (i) a total amount of coins wagered, or (ii) a total amount of coins paid out. Alternatively, reward points may be awarded based on, for example, (i) the length of time or a number of game plays at a gaming device or table game; (ii) the average wager of a player; (iii) whether a player has played a gaming device at a particular time or during a particular time of day; and/or (iv) "theoretical win," a term known in the art which may be determined by multiplying an amount wagered by a hold percentage. As the player accumulates reward points the player may exchange some or all of the reward points for goods or services specified by the reward point program. For example, a player may exchange 1000 reward points for a dinner at a casino restaurant. In some reward point programs the rewards are defined in terms of dollar amounts rather than points. In yet other reward point programs the points are exchangeable into dollar amounts based on a schedule defined by the casino, allowing the player to convert the accumulated points into dollar amounts and then use the dollar amounts to purchase goods or services from the casino. Some casinos offer bonus reward points for play of gaming devices during certain unpopular times. For example, a casino may offer double reward points for play between 2 a.m. and 4 a.m.

Applicants have recognized, however, that conventional reward point programs are not sufficiently effective at motivating a casino patron to remain playing a game (e.g., a gaming device game or table game) or performing another activity beneficial to a casino. Similarly, conventional reward programs are not sufficiently effective at motivating a casino patron to return to playing a game or perform another activity beneficial to a casino. This is at least because conventional reward point programs do not increase a level of reward a patron is eligible for based on the patron's past activity or continuance of an activity and do not provide patrons an opportunity to earn a higher level of reward based on the patron's efforts. Rather, the conventional reward point programs reward a casino patron at the same level, irrespective of whether the player sporadically performs an activity for relatively short durations or maintains performance of an activity for relatively long durations. For example, in conventional reward point programs a player earns reward points at the same rate, irrespective of whether (i) the player plays a gaming device on a sporadic basis and for a few minutes or game plays at a time, or (ii) whether the player has continued to play a gaming device for many continuous hours or for many continuous game plays. Applicants have recognized that a reward program that rewards the latter player at a higher level, or increasingly higher levels, would be successful at turning the former type of player into the latter type of player, which would increase revenues for the casino.

Some casinos do provide an increased rate of reward points during certain times of day (e.g., between 2 a.m. and 4 a.m.), to encourage patrons to play during times of low activity on the casino floor. However, such an increased rate of reward points is not provided to a player in exchange for any effort exerted by the player. Further, the practice of providing extra reward points for playing during times of typically low activity is not provided in exchange for continued play over a duration of time (e.g., the duration being defined by a minimum length of continuous play or a minimum number of consecutive game plays). Accordingly, this practice of providing extra reward points for play during times of typically low activity does not serve to motivate a player to play longer (since the duration of the player's playing is not determinative of the rate at which reward points are earned). Further, this practice of providing extra reward points does not motivate a player to remain playing at a gaming device and thus avoid a loss of the increased rate of earning reward points, since the player feels no sense of investment in having earned the increased rate of reward points based on efforts of the player.

Accordingly, Applicants have invented methods of rewarding a casino patron based on past efforts of the patron, such that a patron may qualify for a higher reward level by continuing to perform an activity beneficial to a casino for durations designated by the casino or other entity. Continuing performance of an activity, as the term is used herein unless otherwise specified, may mean a performance of an activity without interruption of an interval of more than a predetermined duration.

For example, a casino patron may be provided with reward points on an escalating basis based on a length of continuous play or based on a number of consecutive game plays. In a more particular example, a rate at which a casino patron earns reward points may be increased over a duration of continuous play of a gaming device. For example, a casino patron may be provided with one point per game play for a first thirty minutes of continuous play of a gaming device, two points per game play for a second thirty minutes of continuous play of a gaming device, three points per game play for a third thirty minutes of continuous play of a gaming device, and so on. In one embodiment the casino patron may only qualify for an increase in a rate of earning reward points so long as the first thirty minutes is contiguous with the second thirty minutes and the third thirty minutes is contiguous with the second thirty minutes, etc. A first duration of time being contiguous with a second duration of time, as used herein, means that the first duration of time immediately precedes the second duration of time and the second duration of time immediately follows the first duration of time, without intervening interval or without intervening interval greater than a maximum allowable intervening interval.

It should be noted that although the preceding example illustrated earning an increased rate of earning reward points based on time of continuous play, in another embodiment a rate of earning reward points may be increased based on a number of game plays completed or based on another factor that is beneficial to a casino operator or other entity practicing aspects of the present invention. For example, a casino patron may be provided one reward point for the first set of twenty game plays, two reward points for the second set of twenty game plays, three reward points for the third set of twenty game plays, etc. Similarly to the preceding time-based example, in one embodiment the patron in the present example may only qualify for an increase in the rate of earning reward points if the first set of game plays is contiguous with the second set of game plays, the second set of game plays is contiguous with the third set of game plays, etc.

In yet another example, a casino patron may establish a balance of credits at a gaming device (e.g., the player "buys-in" for 100 credits worth $1 each by inserting a $100 bill into a gaming device bill acceptor), and the patron may earn an increased rate of earning reward points as the balance approaches zero. For example, the patron may earn one reward point for every dollar wagered between a balance of $90 and $100, two reward points for every dollar wagered between a balance of $80 and $89, three reward points for every dollar wagered between a balance of $70 and $79, and so on; such a reward system may motivate players to "play down" an entire balance of credits established at a particular a gaming device, as opposed to cashing out before the balance reaches zero (i.e., remain gambling longer at the gambling device).

In still another example, a casino patron may earn an increased rate of earning reward points for each occurrence of a specified symbol, for each predetermined number of occurrences of a specified symbol, for each occurrence of a specified outcome, and/or for each predetermined number of occurrences of a specified outcome. For example, a player's rate of earning reward points may increase for each hand (initial or final) that includes four Jacks. The specified symbol or occurrence may be selected by a casino patron, an operator of a casino or gaming device, or another entity.

If should be noted that although increasing a rate of earning reward points has been described as a method of providing a reward of increasing value to a casino patron in exchange for the patron's continuing to perform (or returning to perform) an activity that benefits a casino or other entity practicing aspects of the present invention, other methods may be employed for so rewarding the patron. For example, a patron may be provided a reward of a first number of reward points (e.g., five) in exchange for a first period of continued game play or a first set of game plays and a second number of reward points (e.g., ten) in exchange for a second period of continued game play or a second set of game plays. In one embodiment the duration of the first period is equal to the duration of the second period and the second number of reward points are only provided to the player if the first period is contiguous with the second period. Similarly, in one embodiment, the first set of game plays includes the same number of game plays as the second set of game plays and the second number of reward points is only provided to the player if the first set of game plays is contiguous with the second set of game plays.

Thus, in accordance with one embodiment, Applicants have invented various methods of motivating a casino patron to remain performing an activity or return to performing an activity by providing the patron with a reward at a certain level, the level of reward being based on the patron's past performance of the activity as well as continued, or return to, performance of the activity.

In accordance with one or more embodiments of the present invention, a method comprises associating, with a member of a casino loyalty program, a benefit of a first value, the benefit of the first value being determined based on a first algorithm based on information related to the member's activity during a first portion of a period of time. The method further comprises associating, with the member, a benefit of a second value, the benefit of the second value being determined based on a second algorithm based on information related to the member's activity during a second portion of the period of time, the second portion occurring after the first portion. Further, associating the benefit of the second value is only performed if associating the benefit of the first value is first performed.

In accordance with one embodiment, a method of playing a slot machine comprises determining a beginning of a play session by a player of a slot machine and awarding, to the player, reward points at a first rate during a first portion of a play session. The method further comprises awarding, to the player, reward points at a second rate that is greater than the first rate during a second portion of the play session if the player qualifies for the second rate by satisfying one or more predetermined conditions. Further, the play session is a continuous play of one or more gaming devices that is not interrupted by an interval of more than a maximum length of time.

In the following description, reference is made to the accompanying drawings that form a part hereof, and in which is shown, by way of illustration, specific embodiments in which the invention may be practiced. These embodiments are described in sufficient detail to enable those skilled in the art to practice the invention, and it is to be understood that other embodiments may be utilized and that structural, logical, software, and electrical changes may be made without departing from the scope of the present invention. The following description is, therefore, not to be taken in a limited sense.

Any enumerated listing of items herein does not imply that any or all of the items are mutually exclusive, unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

Terms

Before turning to the detailed description of the figures, the meanings of some terms as used herein will be clarified. Throughout the description of the present invention and unless otherwise specified, the following terms may include the meanings provided in this section. These terms and illustrative meanings are provided to clarify the language selected to describe embodiments of the invention both in the specification and in the appended claims.

The terms "a", "an" and "the" mean "one or more", unless expressly specified otherwise.

The terms "embodiment", "an embodiment", "embodiments", "the embodiment", "the embodiments", "one or more embodiments", "some embodiments", and "one embodiment" mean "one or more (but not all) embodiments of the present invention(s)" unless expressly specified otherwise.

The term "game" may refer to a wagering activity whereby a player posts consideration, usually monetary in form, in exchange for a chance at winning a payout. The definition is intended to include basic games and bonus games.

The term "game play" may refer to a single attempt by a player to win a prize by playing a game of a gaming device. A game play begins when the player places a wager for the attempt and ends when the final outcome of the attempt is displayed to the player and the gaming device becomes available for the next game play. For example, in a reel-based slot machine game, a game play may begin when the player indicates a wager amount to be placed (e.g., three credits) and ends when the reels stop spinning and the symbols comprising the outcome are displayed along a payline of the gaming device. In games including a bonus round where the player has qualified for the bonus round, a final outcome of an attempt may occur (and thus the game play may end) when the outcome of the bonus round is displayed to the player. In a video poker gaming device, a game play may begin when a player places a wager on the next hand (e.g., by actuating the "Bet 3" button) and may end when the cards comprising the final hand are displayed to the player. In a video poker game that allows a player to re-play an initial hand (e.g., by providing extra payment and changing a decision as to whether to hold or discard a particular card of the initial hand), the game play may end once the second final hand (based on the player's changed decision) is displayed to the player.

The term "gaming device" and "slot machine" are used interchangeably herein and refer to any electrical, mechanical, electro-mechanical and/or other device that may accept a wager, may follow a process to generate an outcome, and may pay winnings based on the outcome. The outcome may be randomly generated, as with a slot machine; may be generated through a combination of randomness and player skill, as with video poker; or may be generated entirely through player skill. A gaming device may include any gaming machine and/or system, including reeled slot machines (mechanical or electronic), video poker machines, video bingo machines, video roulette machines, video keno machines, video blackjack machines, pachinko machines, redemption games, arcade games, video games, video lottery terminals, online gaming systems, sports betting machines, game consoles, personal computers logged into online gaming sites, etc. In one or more embodiments, a gaming device may comprise a computing device operable to execute software that simulates play of a reeled slot machine game, video poker game, video blackjack game, video keno game, video roulette game, or lottery game. Gaming devices may or may not be owned and/or maintained by a casino and/or may or may not exist within a casino location.

The terms "including", "comprising" and variations thereof mean "including but not limited to", unless expressly specified otherwise.

The term "increased level of reward" as used herein may refer to a method of earning a reward that allows an entity to earn a reward of a higher value for a period of time than the entity would earn for the same unit of time at a level of reward below the increased level of reward.

The term "outcome" as used herein, may refer to a result of a game play of a game such as a table game or a game played via a gaming device. The result of a game play may comprise one or more symbols or depictions of symbols obtained by a player (e.g., cards dealt to a player in a card game, dice numbers rolled by a player, reel symbols of a slot machine along a payline, depictions of cards dealt to a player in a video poker game, etc.). An outcome may comprise symbols contained or displayed in a predefined area (e.g., on a display screen of a gaming device, along a payline of a reeled slot machine). It should be noted that an outcome as used herein includes a partial result of a game play. For example, four (4) cards to a flush in a table poker or video poker game may comprise an outcome even though the game does not typically end until the player is dealt five cards. It should also be noted that an outcome in table poker or video poker may comprise an initial hand, a final hand, or a combination thereof. In embodiments wherein the outcome is an outcome of a reeled slot machine, the outcome may comprise symbols along the payline of the slot machine as well as symbols not along the payline of the slot machine. For example, a display of "cherry-bar-bar" along the payline, with a bar symbol just above or below the cherry symbol may comprise an outcome for purposes of the present invention. In other embodiments, an outcome may comprise a result of a bonus game (e.g., an animated sequence reveals a payout of 150 credits).

The term "peripheral device" may refer to any device associated with one or more gaming devices, the peripheral device being operable to perform any of the functions described herein. For example, in one embodiment a prior art gaming device may be retrofitted with a peripheral device that comprises a processor, memory, and a program in accordance with which the device may detect, record, analyze and/or transmit data related to activity of a player (e.g., game play activity) in accordance with embodiments of the present invention. A peripheral device may or may not be attached to a gaming device. A peripheral device may or may not be operable to direct the associated gaming device to perform certain functions. A peripheral device, or portions thereof, may be housed inside the casing of the associated gaming device. For example, a peripheral device may be operable to detect one or more signals output by a processor of a gaming device. Further still, a peripheral device may be operable to communicate with a processor of an associated gaming device.

The terms "player", "casino player", "casino patron", "patron" are used interchangeably herein and may refer to any entity the activities of which may be monitored to determine whether the entity qualifies for an increased level of reward (e.g., an increased rate of earning reward points). A casino patron is not necessarily a member of a casino loyalty club (e.g., a "slot club").

The terms "play session", "gambling session", "gaming session", "player session" and "game session" shall be synonymous herein and may refer to the space of time with a beginning point and an end point that is not interrupted by an interval of more than a maximum duration or that is not otherwise disrupted by a disqualifying condition, during which space of time a casino patron qualifies for levels of reward (e.g., rates of earning reward points) on an escalating basis. In one embodiment the beginning point may be signified by an initiation or completion of a first game play at a gaming device. In another embodiment, a beginning point is signified by an insertion of a player tracking card into a player tracking module of a gaming device. In one embodiment the end point may be signified by an initiation or completion of a game play that is not followed by another game play for more than a maximum period of time. In another embodiment, an end point is signified by a removal of a player tracking card from a player tracking module of a gaming device. In yet another embodiment, an end point may be signified by a player's actuation of an input device, such as a button labeled "cashout," "collect," "print ticket," "end" and/or "quit."

A play session may occur on more than one gaming device. For example, a player may begin a play session on a first gaming device and end the play session on another gaming device.

A play session may occur over more than one day. For example, a play session may begin when a player checks into a hotel room and may continue until the player checks out of the hotel room, so long as the player gambles for at least a predetermined period of time or for a predetermined number of game plays during each interval of a predetermined number of intervals. For example, the player may be required to play one or more gaming devices for at least one hour during each day of the player's stay at the hotel.

The above-described and other embodiments of the present invention may be better understood with reference to the figures, as described below. In the following description, reference is made to the accompanying figures that form a part hereof, and in which is shown, by way of illustration, specific embodiments in which the invention may be practiced. These embodiments are described in sufficient detail to enable those skilled in the art to practice the invention, and it is to be understood that other embodiments may be utilized and that structural, logical, software, and electrical changes may be made without departing from the scope of the present invention. The following description is, therefore, not to be taken in a limited sense.

Systems and Devices

Referring now to FIG. 1A, an embodiment 100A of a system in accordance with embodiments of the present invention includes a computing device 110 that is operable to communicate with one or more gaming devices 115 via a network such as the Internet (wired and/or wirelessly), via a protocol such as the IGT™ SAS™ protocol (e.g., the 6.00 SAS™ protocol), via another network protocol, or via other means for communication as would be understood by those of ordinary skill in the art.

Although only three gaming devices 115 are depicted in FIG. 1A, any number of gaming devices may be in communication with the controller 110. Although not pictured, other casino devices besides gaming devices 104, 106, 108 may be connected to the casino server 102. Likewise, servers of other casinos and other establishments may be in direct or indirect communication with the casino server 102.

Each of the gaming devices 115 is depicted as including a player tracking module 120. It should be noted that, in one or more embodiments, a player tracking module may comprise or be a component of a peripheral device, as defined herein. A player tracking module may comprise hardware and/or software operable to detect, receive, record, analyze and/or transmit data associated with game play activity of a player (e.g., player identifier, wager amounts, payouts won, rate of play, length of play session, etc.). In one embodiment, a player tracking module may be operable to output messages to a player. An example player tracking module is described in detail with respect to FIG. 4 below.

Communication with the computing device 110 may be direct or indirect. For example, communication may be via the Internet through a Web site maintained by computing device 110 on a remote server or via an on-line data network including commercial on-line service providers, bulletin board systems and the like. In some embodiments, the gaming devices 115 may communicate with computing device 110 over radio frequency ("RF"), infrared ("IR"), cable TV, satellite links and the like, including combinations thereof.

In some embodiments, a player tracking module 120 may be operable to communicate directly with computing device 110 via a network such as the Internet (wired and/or wirelessly), via another network protocol, or via other means for communication as would be understood by those of ordinary skill in the art. Such communication may be in addition to or instead of communication with the controller 110 via a gaming device 115 associated with the player tracking module 120.

In some embodiments, the computing device 110 may not be present or the functions thereof may be minimized from those described herein. For example, some or all of the functions described herein as being performed by computing device 110 may instead or in addition be performed by another device (e.g., a gaming device 115). Similarly, any or all of the data described herein as being stored by computing device 110 may instead or in addition be stored by another device (e.g., a gaming device 115).

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

The computing device 110 may function as a "Web server" that generates Web pages (documents on the Web that typically include an HTML file and associated graphics and script files) that may be accessed via the Web and allows communication with the computing device 110 in a manner known in the art. Those of skill in the art will understand that there are a variety of well-known ways for creating and operating Web pages, and accordingly a detailed description of such known processes is omitted here for clarity.

Any and all of the computing device 110, the gaming devices 115, and player tracking modules 120 may comprise a computing device including a processor that operates in accordance with instructions of a program that instructs the device to operate in accordance with one or more embodiments of the present invention. For example, any or all of the computing device 110, the gaming devices 115, and player tracking modules 120 may comprise, e.g., a conventional personal computer, a portable type of computer, such as a laptop computer, a palm-top computer, a hand-held computer, a Personal Digital Assistant (PDA), a gaming device, or combinations thereof.

In some embodiments (i) the computing device 110 and a gaming device 115; (ii) the computing device 110 and a player tracking module 120; (iii) a gaming device 115 and a player tracking module 120; or (iv) the computing device 110, a gaming device 115 and a player tracking module 120 may comprise the same device or components of the same device.

In one or more embodiments the computing device 110 may be operable to communicate with one or more gaming devices in addition to, or in lieu of, being operable to communicate with the player tracking modules 120. For example, the computing device 110 may be operable to communicate with one or more gaming devices that do not operate in accordance with embodiments of the present invention. In another example, the computing device 110 may be operable to communicate with one or more point-of-sale terminals (e.g., of a store or restaurant of a casino), one or more point-of-sale servers, one or more hotel reservation systems or other devices via which activity of a casino patron may be determined.

Figure 1B:
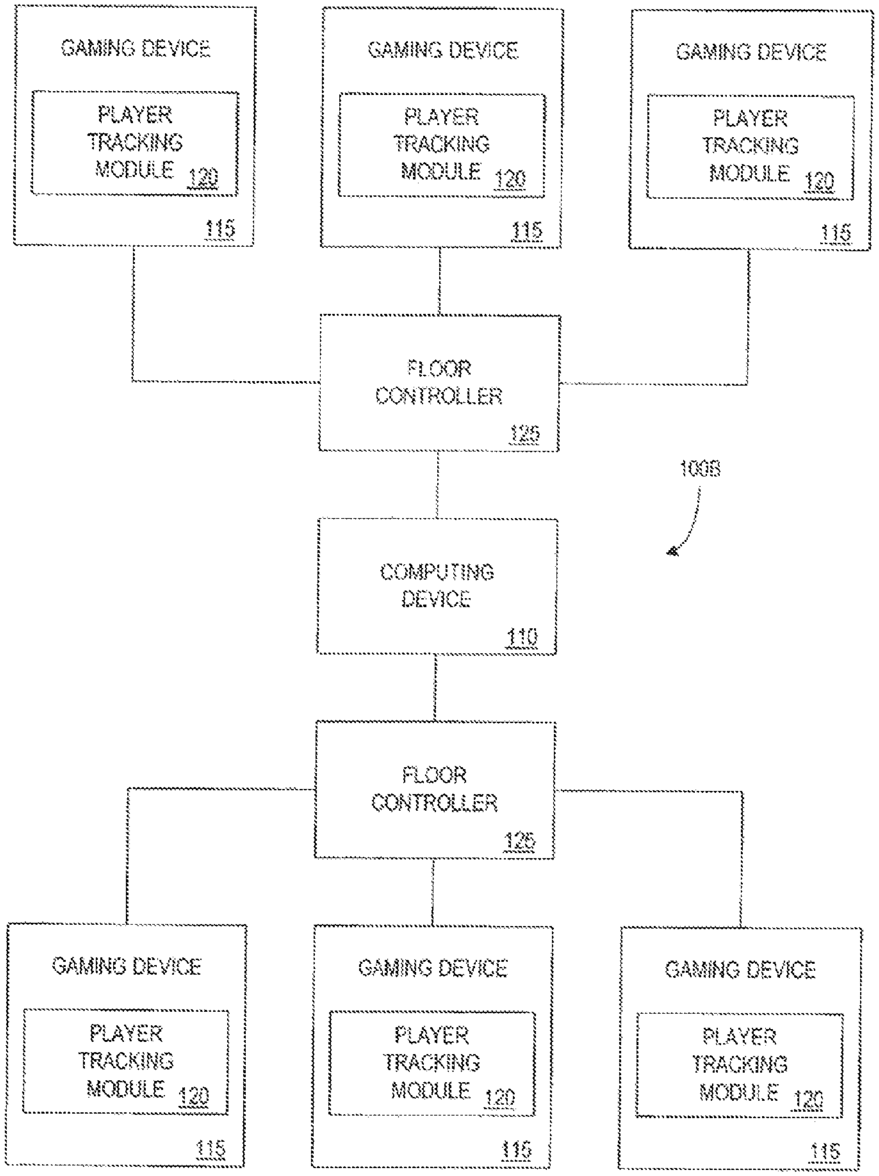
FIG. 1B is a block diagram of an example system, in accordance with one or more embodiments of the present invention.

Referring now to FIG. 1B, illustrated therein is an embodiment 100B of a system in accordance with some embodiments of the present invention. In addition to the devices of system 100A, system 100B further includes one or more floor controllers 125. A floor controller 125 may be in one or two-way communication with computing device 110. As shown in the embodiment depicted in FIG. 1B, a floor controller 125 may be disposed between the computing device 110 and gaming devices 115.

One difference between the two alternative embodiments depicted in FIGS. 1A and 1B is that the embodiment of FIG. 1B includes the one or more floor controllers 125 which may be operable by the same entity that operates the computing device 110 or a distinct and/or physically remote entity. In operation, a computing device 110 may perform the methods of the present invention by sending signals to a floor controller 125 to be relayed to the gaming devices 115. Further, a floor controller 125 may perform methods of the present invention by sending receiving or retrieving information from the gaming devices 115 and forwarding the information, or data based on the information, to computing device 110. For example, a floor controller 125 may support up to a predetermined number of gaming devices 115 and be operable to monitor the activity level of the corresponding gaming devices and issue commands to the associated gaming devices. In one particular example, a floor controller may be operable to issue status requests to the gaming devices in communication therewith and/or to receive status reports there from.

In either embodiment 100A or embodiment 100B, the computing device 110 may, in at least one respect, function as a file server, operable to receive and store data from one or more devices (e.g., gaming devices and/or floor controllers) and thus essentially comprise a virtual hard disk for the devices. In one embodiment, the computing device 110 may comprise one or more high performance computers or work stations having a large hard disk capacity and be operable to store gaming device and/or casino patron activity therein. In one or more embodiments the computing device 110 may further be operable to calculate or otherwise determine a value of a benefit to be associated with a patron based on the patron's current and/or past activity. For example, the computing device 110 may be operable to (i) calculate a number of reward points to be awarded to a patron based on the current rate of reward points the patron qualifies for at a given point in time, and/or (ii) associate the number of reward points with the patron.

In the embodiment of FIG. 1A, the functions of the floor controllers 125 may be consolidated into the computing device 110 and vice versa.

An additional difference between the embodiments of FIG. 1A and FIG. 1B relates to the physical topology of the systems 100A and 100B. In both of the depicted embodiments, each node may securely communicate with every other node in the system 100A, 100B via, for example, a virtual private network (VPN). Thus, all nodes may be logically connected. However, the embodiment depicted in FIG. 1B allows a floor controller 125 to optionally serve as a single gateway between the nodes 110 and 115. In some embodiments of the present invention, the centralization, security, and control that naturally results from this topology is useful in operating, maintaining, and monitoring use of the system.

Of course it should be understood that any appropriate system operable to determine a casino patron's activity and reward the patron therefore may be used in conjunction with the methods described herein. For example, the system described in U.S. Pat. No. 6,431,983 to Acres may be used to implement aspects of the present invention. U.S. Pat. No. 6,431,983 is incorporated by reference herein for all purposes. In another example, an appropriate system may comprise the SDS slot-accounting and player-tracking system made by Bally Gaming Systems™. As is known to one of ordinary skill in the art, the SDS system is an integrated information system that continually monitors slot machines, other gaming devices, and customer gaming activity. Accordingly, the SDS system may be utilized to implement aspects of the present invention by being utilized to track player gaming activity in order to determine whether a player has qualified for an elevated level of reward or increased rate of earning rewards. In yet another example, the IGT Advantage™ Casino System may be utilized to implement aspects of the present invention. In still another example, the OASIS™ Casino Management System by Aristocrat Technologies Inc. may be utilized to implement aspects of the present invention. It should be noted that, as would be understood by one of ordinary skill in the art upon reading the present disclosure, any of the afore-mentioned systems may need to be modified to implement one or more embodiments of the present disclosure. Such modifications would be readily understood by one of ordinary skill in the art upon reading the present disclosure.

Figure 2:
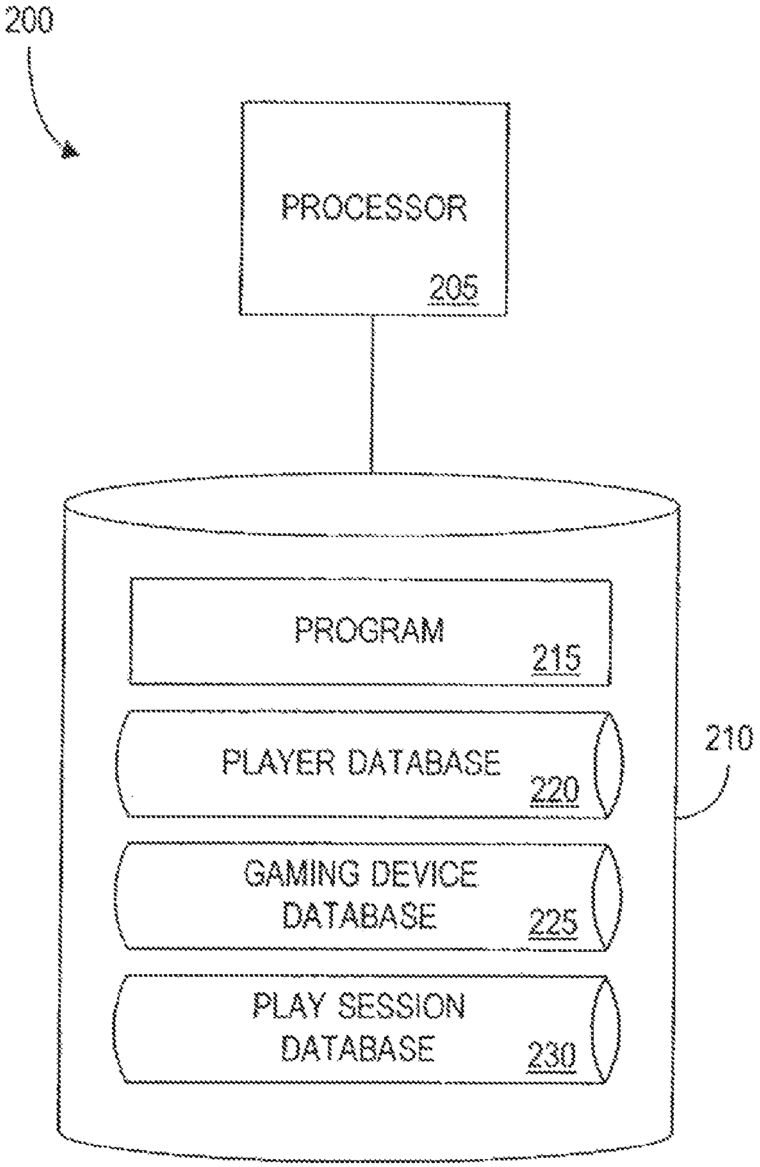
FIG. 2 is a block diagram of an example computing device, such as a casino server, in accordance with one or more embodiments of the present invention.

Referring now to FIG. 2, illustrated therein is an embodiment 200 of an example computing device 110, in accordance with one or more embodiments of the present invention. For purposes of brevity, embodiment 200 will be referred to as computing device 200 herein. The computing device 200 may function, for example, as the controller 110 and/or a floor controller 125 described in FIGS. 1A and 1B. The computing device 110 may be implemented as a system controller, a dedicated hardware circuit, an appropriately programmed general purpose computer, or any other equivalent electronic, mechanical or electro-mechanical device.

The computing device 200 comprises a processor 205, such as one or more Intel® Pentium® processors. As is well known in the art, the processor 205 may be in communication with a communication port (not shown in FIG. 2) or other means for facilitating communication between the processor 205 and other devices.

The processor 205 is also in communication with a data storage device 210. The data storage device 210 comprises an appropriate combination of magnetic, optical and/or semiconductor memory, and may include, for example, Random Access Memory (RAM), Read-Only Memory (ROM), a compact disc and/or a hard disk. The processor 205 and the storage device 210 may each be, for example: (i) located entirely within a single computer or other computing device; or (ii) connected to each other by a remote communication medium, such as a serial port cable, telephone line or radio frequency transceiver or other wired or wireless media. In one embodiment, the computing device 200 may comprise one or more computers that are connected to a remote server computer for maintaining databases.

The data storage device 210 stores a program 215 for controlling the processor 205. The processor 205 performs instructions of the program 215, and thereby operates in accordance with the embodiments of the present invention, and particularly in accordance with the methods described in detail herein. The program 215 may be stored in a compressed, uncompiled and/or encrypted format. The program 215 furthermore includes program elements that may be necessary, such as an operating system, a database management system and "device drivers" for allowing the processor 205 to interface with computer peripheral devices. Appropriate program elements are well known to those of ordinary skill in the art, and need not be described in detail herein.

According to an embodiment of the present invention, the instructions of the program 215 may be read into a main memory from another computer-readable medium, such from a ROM to RAM. Execution of sequences of the instructions in program 215 causes processor 205 to perform the process steps described herein. In alternative embodiments, hard-wired circuitry may be used in place of, or in combination with, software instructions for implementation of the processes of the present invention. Thus, embodiments of the present invention are not limited to any specific combination of hardware and software.

The data storage device 210 also stores (i) a player database 220, (ii) a gaming device database 225, and (iii) a play session database 230. The databases are described in detail below and depicted with exemplary entries in the accompanying figures. As will be understood by those skilled in the art, the schematic illustrations and accompanying descriptions of the databases presented herein are exemplary arrangements for stored representations of information. Many other arrangements may be employed besides those suggested by the tables shown. Similarly, the illustrated entries of the databases represent exemplary information only; those skilled in the art will understand that the number and content of the entries can be different from those illustrated herein. Further, some or all of the information stored in computing device 200 may, in some embodiments, be stored in one or more other devices (e.g., a gaming device and/or a floor controller 125). The storage of such information in one or more other devices may be in addition to or instead of storage of such information in computing device 200.

In some embodiments, the computing device 200 may further comprise, or be in communication with, an output device, for outputting information to a person or another computing device. Examples of an output device include a printer, a kiosk, a screen, a personal computer, a laptop computer, a personal digital assistant, a speaker, a gaming device, a Radio Frequency (RF) transmitter, a modem, and any combination thereof.

In accordance with one or more embodiments of the present invention, the computing device 200 may be operable to perform one or more functions related to tracking a casino patron's activities. In accordance with one embodiment, the computing device 200 may be operable to determine, transmit information about and/or provide rewards to a casino patron. As described herein, a reward may be provided based on the casino patron's past, current and/or continued activity (or activities) that are beneficial to an operator of a casino.

In one embodiment, the computing device 200 may be operable to determine (e.g., receive or retrieve from a gaming device, directly or via a floor controller) information related to gambling or other activity of a casino patron. For example, the computing device 200 may be operable to track the gambling activity of a player at the gaming device. In a more particular example, the computing device may be operable to receive or retrieve a player identifier of a player playing the gaming device, a time at which the player began playing the gaming device, a rate at which the player plays the gaming device (e.g., number of game plays initiated or completed per unit of time), wager amounts placed by the player, a number of game plays initiated or completed by the player, and/or a time at which the player finishes playing the gaming device.

In one embodiment, a gaming device and/or floor controller may be programmed to transmit, to computing device 200, information related to gambling activity at predetermined intervals (e.g., every five minutes). In another embodiment, a gaming device and/or floor controller may be programmed to transmit information related to gambling activity in response to a query from the computing device 200. In another embodiment, a gaming device and/or floor controller may be programmed to transmit, to computing device 200, information related to gambling activity in response to one or more other predetermined events (e.g., insertion of a player tracking card into the gaming device, initiation of a game play, completion of a game play, removal of a player tracking card, etc.).

In another example, the computing device 200 may be operable to determine, for a casino patron, shopping or other activity unrelated to gambling. For example, the computing device 200 may be operable to determine purchases made by the casino patron at a merchant (e.g., merchandise store, show venue or restaurant) associated with the casino. The computing device 200 may determine such information by communication with a POS device of the merchant. In another example, the computing device 200 may be operable to determine reservations made and/or fulfilled by the casino patron at a hotel associated with the casino. The computing device 200 may determine such information, for example, by communicating with a hotel reservation system of the hotel.

In one embodiment, the computing device 200 may be operable to determine a value of a reward to be provided to a patron of a casino. For example, the computing device 200 may be operable to determine a rate of rewards (or other level of reward) that the patron is qualified for and determine the reward based thereon. In a more particular example, the computing device 200 may be operable to track a player's gambling session at a gaming device and calculate the number of reward points to be awarded to the player in exchange for the player's gambling activity during the gambling session. In one embodiment, the computing device 200 may further be operable to associate the determined reward (e.g., number of reward points earned) in association with the player. For example, the computing device 200 may be operable to access a record associated with the player in a player database and store an indication of earned reward points in the record.

In one embodiment, the computing device 200 may be operable to communicate with a casino patron, informing the casino patron of reward information associated with the patron. For example, the computing device 200 may be operable to cause a player tracking module of a gaming device being played by a player to display one or more messages to the player. The computing device 200 may, for example, direct the gaming device to display the message and the gaming device may in turn direct the player tracking module to display the message. In another embodiment, the computing device 200 may direct the player tracking module to display the message. In yet another embodiment, the computing device 200 may cause the message to be output to the player via a display other than a display of a player tracking module (e.g., another display of the gaming device or a display of a player device).

The message may include, for example, information related to (i) a current value of a reward earned by the player (e.g., "You have earned 200 reward points so far in this gaming session");

(ii) a current level of reward points the player has qualified for (e.g., "You are earning 2 reward points per game play right now! That's twice the normal rate!");

(iii) a value of a reward the player may potentially earn (e.g., "If you play for another five minutes, you will get a bonus of 5 reward points!");

(iv) a level of reward the player may potentially qualify for (e.g., "Four more game plays and you qualify for double reward points!"); and or (v) information related to activity a player must perform in order to maintain a current level of reward (e.g., "Don't slow down! You have to play at least 10 game plays per minute in order to keep earning the double reward points you have qualified for during this gaming session! Don't let all your hard work go to waste!").

Figure 3:
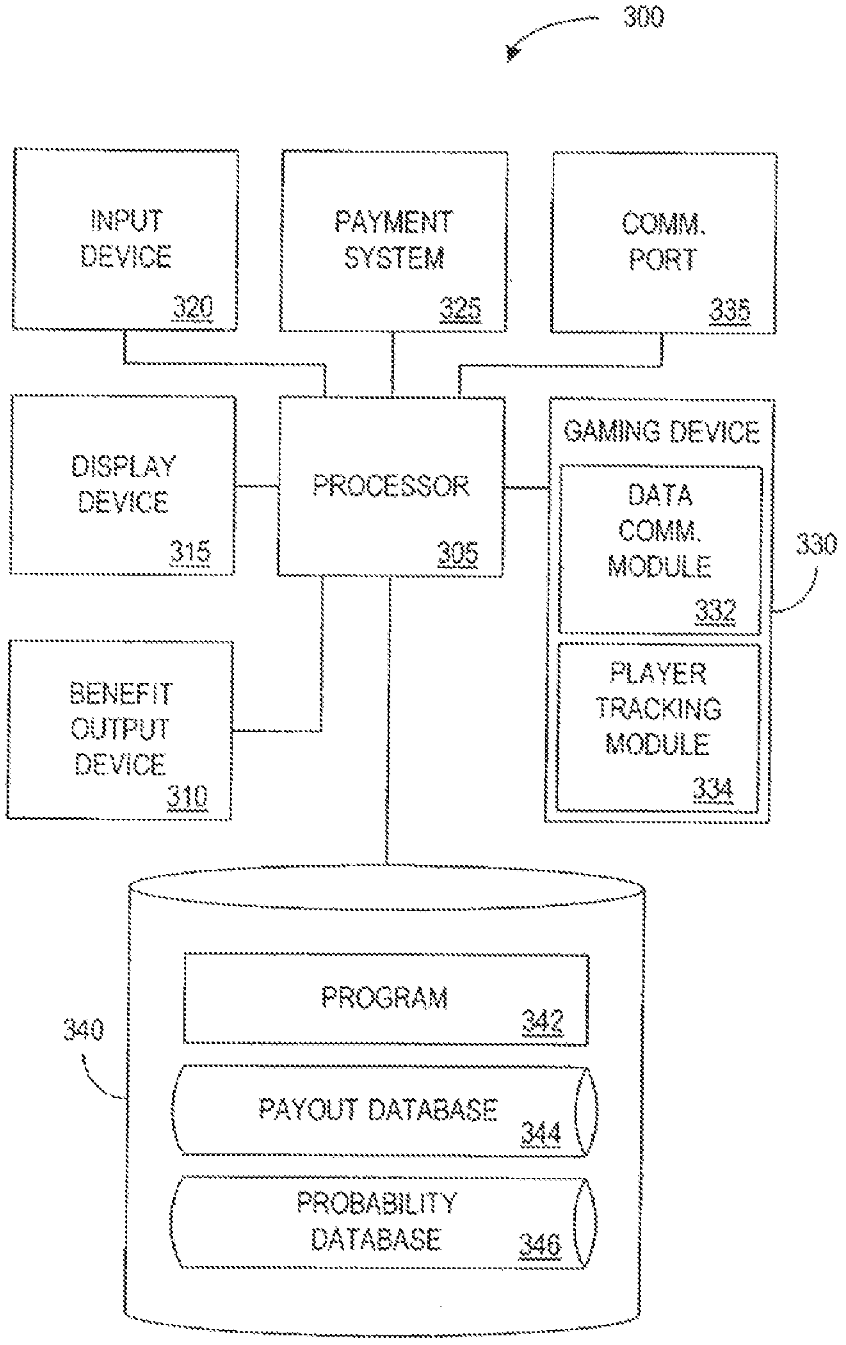
FIG. 3 is a block diagram of an example gaming device, in accordance with one or more embodiments of the present invention.

Referring now to FIG. 3, a block diagram of an exemplary embodiment 300 of a gaming device is illustrated. The embodiment 300 of an exemplary gaming device is referred to as gaming device 300 herein. The gaming device 300 may be implemented as a system controller, a dedicated hardware circuit, an appropriately programmed general-purpose computer, or any other equivalent electronic, mechanical or electro-mechanical device.

The gaming device 300 may comprise, for example, a slot machine, a video poker machine, a video blackjack machine, a video keno machine, a video lottery machine, a pachinko machine or a table-top game. In various embodiments, a gaming device may comprise, for example, a personal computer (e.g., which communicates with an online casino Web site), a telephone (e.g., to communicate with an automated sports book that provides gaming services), or a portable handheld gaming device (e.g., a PDA). The gaming device 300 may comprise any or all of the gaming devices of the aforementioned systems. In some embodiments, a user device such as a PDA or cell phone may be used in place of, or in addition to, some or all of the gaming device components. Further, a gaming device may comprise a personal computer or other device operable to communicate with an online casino and facilitate game play at the online casino. Further, as described herein, in one or more embodiments a gaming device may comprise a player tracking module.

The gaming device 300 comprises a processor 305, such as one or more Intel® Pentium® processors. The processor 305 may be operable to communicate with a random number generator (not shown). A random number generator may comprise one or more hardware and/or software modules. A random number generator may be a component of gaming device 300 or another device (e.g., computing device 110 and/or floor controller 125).

A random number generator, in accordance with at least one embodiment of the present invention, may generate data representing random or pseudo-random values (referred to as "random numbers" herein). The random number generator may generate a random number, for example, every predetermined unit of time (e.g., every thousandth of a second) or in response to an initiation of a game on the gaming device. In the former embodiment, the generated random numbers may be used as they are generated (e.g., the random number generated at substantially the time of game initiation is used for that game) and/or stored for future use. A random number generated by the random number generator may be used by the processor to determine, for example, at least one of an outcome and payout. A random number generator, as used herein, may be embodied as a processor separate from but working in cooperation with the processor. Alternatively, the random number generator may be embodied as an algorithm, program component, or software stored in the memory of the gaming device and used to generate a random number. Note that, although the generation or obtainment of a random number is described herein as involving a random number generator of a gaming device, other methods of determining a random number may be employed. For example, a gaming device owner or operator may obtain sets of random numbers that have been generated by another entity. HotBits™ for example, is a service that provides random numbers that have been generated by timing successive pairs of radioactive decays detected by a Geiger-Muller tube interfaced to a computer. A blower mechanism that uses physical balls with numbers thereon may be used to determine a random number by randomly selecting one of the balls and determining the number thereof.

The processor 305 may also be operable to communicate with a benefit output device 310, which may be a component of gaming device 300. The benefit output device 310 may comprise one or more devices for outputting a benefit to a player of the gaming device.

For example, in one embodiment the gaming device 300 may provide coins and/or tokens as a benefit. In such an embodiment the benefit output device 310 may comprise a hopper and hopper controller, for dispensing coins and/or tokens into a coin tray of the gaming device.

In another example, the gaming device 300 may provide a receipt or other document on which there is printed an indication of a benefit (e.g., a cashless gaming receipt that has printed thereon a monetary value, which is redeemable for cash in the amount of the monetary value and/or for credits at another gaming device). In such an embodiment the benefit output device 310 may comprise a printing and document dispensing mechanism.

In yet another example, the gaming device 300 may provide electronic credits as a benefit (which, e.g., may be subsequently converted to coins and/or tokens and dispensed from a hopper into a coin tray). In such an embodiment the benefit output device 310 may comprise a credit meter balance and/or a processor that manages the amount of electronic credits that is indicated on a display of a credit meter balance.

In yet another example, the gaming device 300 may credit a monetary amount to a financial account associated with a player as a benefit provided to a player. The financial account may be, for example, a credit card account, a debit account, a charge account, a checking account, or a casino account. In such an embodiment the benefit output device 310 may comprise a device for communicating with a server on which the financial account is maintained (e.g., computing device 110).

In some embodiments, a financial account associated with a player may alternately or additionally be stored upon a smart card, as is known in the art. A smart card may comprise a memory for storing data (e.g., an amount of credits, a player identifier, player data, play session data, and so on). Thus, a smart card may be configurable to facilitate a variety of functions, such as identifying a player, storing an indication of a monetary amount due to a player, and so on. In such an embodiment, the benefit output device 310 may comprise a device for communicating with a smart card on which a financial account is maintained. One example of such commercially available smart card technology is the s-Choice™ Smart Card Casino Management System produced by Smart Card Integrators, Inc.™ (e.g., such a system may comprise one or more smart card reader devices such as the s-Choice™ 3200, one or more ISO-compliant smart cards, one or more data collection devices, and so on).

Note that, in one or more embodiments, the gaming device 300 may include more than one benefit output device 310. For example, the gaming device 300 may include both a hopper and hopper controller combination and a credit meter balance. Such a gaming device 300 may be operable to provide more than one type of benefit to a player of the gaming device.

A single benefit output device 310 may be operable to output more than one type of benefit. For example, a benefit output device 310 may be operable to increase the balance of credits in a credit meter and communicate with a remote device in order to increase the balance of a financial account associated with a player.

In one embodiment, a benefit output device 310 may comprise a sub-component of another component of the gaming device 300. For example, in one embodiment a benefit output device 310 may comprise a meter that indicates a number of reward points earned by a player, a number of reward points being earned by a player, a rate at which a player is currently earning reward points and/or a rate at which a player may potentially earn reward points. In such an embodiment, the benefit output device 310 may comprise a display (e.g., such as a display of a player tracking module, which is described below).

The processor 305 is also operable to communicate with one or more display device(s) 315, which may be a component of gaming device 300. The display device 315 may comprise, for example, one or more display screens or areas for outputting information related to game play on the gaming device, such as a cathode ray tube (CRT) monitor, liquid crystal display (LCD) screen (e.g., a touch-sensitive LCD screen), or light emitting diode (LED) screen.

In one or more embodiments, a gaming device 300 may comprise more than one display device 315. For example, a gaming device may comprise an LCD display for displaying electronic reels, a display area that displays rotating mechanical reels, a display area that displays a payout schedule, a display area that displays bonus round information, and a display area that displays reward information.

The processor 305 may also be operable to communicate with one or more other output devices besides the display device, for outputting information (e.g., to a player or another device). Such other one or more output devices may also be components of a gaming device. Such other one or more output devices may comprise, for example, an audio speaker (e.g., for outputting an outcome or information related thereto, in addition to or in lieu of such information being output via a display device), an infra-red transmitter, a radio transmitter, an electric motor, a printer (e.g., such as for printing cashless gaming vouchers), a coupon or product dispenser, an infra-red port (e.g., for communicating with a second gaming device or a portable device of a player), a Braille computer monitor, and a coin or bill dispenser. For gaming devices, common output devices include a cathode ray tube (CRT) monitor on a video poker machine, a bell on a gaming device (e.g., rings when a player wins), an LED display of a player's credit balance on a gaming device, an LCD display of a personal digital assistant (PDA) for displaying keno numbers.

The processor 305 may also be operable to communicate with one or more input device(s) 320. An input device comprises a device that is capable of receiving an input (e.g., from a player or another device) and which may be a component of gaming device 300. An input device may communicate with or be part of another device (e.g., a server, computing device 110, another gaming device, a player tracking module, etc.). Some examples of input devices include: a bar-code scanner, a magnetic stripe reader, a computer keyboard or keypad, a button, a handle, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, an infrared port (e.g., for receiving communications from a second gaming device or from a another device such as a smart card or PDA of a player), and a weight scale. For gaming devices, common input devices include a button or touch screen on a video poker machine, a lever or handle connected to the gaming device, a magnetic stripe reader to read a player tracking card inserted into a gaming device, a touch screen for input of player selections during game play, and a coin and bill acceptor.

The processor 305 may also be operable to communicate with a payment system 325, which may be a component of the gaming device 300. The payment system 325 is a device capable of accepting payment from a player (e.g., a bet or initiation of a balance or a payment for re-outputting an outcome of a prior game play) and/or providing payment to a player (e.g., a payout for an outcome of a current game play). Payment is not limited to money, but may also include other types of consideration, including products, services, and alternate currencies. Exemplary methods of accepting payment by the payment system 325 include (i) receiving hard currency (i.e. coins or bills), and accordingly the payment system may comprise a coin or bill acceptor; (ii) receiving an alternate currency (e.g., a paper cashless gaming voucher, a coupon, a non-negotiable token), and accordingly the payment system may comprise a bar code reader or other sensing means; (iii) receiving a payment identifier (e.g., a credit card number, a debit card number, a player tracking card number, a financial account number) and debiting the account identified by the payment identifier; and (iv) determining that a player has performed a value-added activity (e.g., participating in surveys, monitoring remote images for security purposes, referring friends to the casino).

The processor 305 is also operable to communicate with an electronic module 330. The electronic module 330 may be utilized by the gaming device 300 to communicate with one or more devices (e.g., one or more floor controllers 125 and/or computing device 110). The electronic module 330 may comprise a module that can be inserted into a pre-existing gaming device. The electronic module 330 may allow another device (e.g., a floor controller 125 and/or computing device 110) to uniquely identify the gaming device on the network and/or to identify the gaming device type. The electronic module 330 may comprise two sub-components: a data communication module 332 and a player tracking module 334.

The data communication module 332 may comprise software and/or hardware. Further, the data communication module 332 may be operable to track various data associated with the gaming device. Examples of such data include, but are not limited to, coin-in, coin-out, coins to drop, games played, game plays initiated, and/or completed, door opens, jackpot occurrences, outcomes obtained, and/or a rate of play of the gaming device.

A player tracking module 334 may comprise hardware and/or software. Further, the player tracking module may be operable to detect information related to a player and/or to otherwise keep track of a player that is playing the gaming device. For example, a player tracking module may be operable to read a player identifier from a player tracking card inserted therein, determine the time at which the card is inserted, detect a removal of the card and/or determine a time at which the card is removed. An example player tracking module 334 is described in detail with respect to FIG. 4.

The electronic module 330 may comprise additional components, such as a controller, memory, clock, serial machine interface, display, etc. Such additional components would be understood by one of ordinary skill in the art and need not be described herein.

The processor 305 may also be operable to communicate with a communications port 335 (e.g., for communicating with one or more other devices) and a data storage device 340. The data storage device 340 may comprise an appropriate combination of magnetic, optical and/or semiconductor memory, and may include, for example, Random Access Memory (RAM), Read-Only Memory (ROM), a compact disc and/or a hard disk. The data storage device 340 may comprise or include any type of computer-readable medium. The processor 305 and the data storage device 340 may each be, for example: (i) located entirely within a single computer or other device; or (ii) connected to each other by a remote communication medium, such as a serial port cable, telephone line or radio frequency transceiver. In one embodiment, the gaming device 300 may comprise one or more devices that are connected to a remote server computer for maintaining databases.

The data storage device 340 stores a program 342 for controlling the processor 305. The processor 305 performs instructions of the program 342, and thereby operates in accordance with the present invention, and particularly in accordance with the methods described in detail herein. The program 342 may be stored in a compressed, uncompiled and/or encrypted format. The program 342 furthermore includes program elements that may be necessary, such as an operating system, a database management system and "device drivers" for allowing the processor to interface with computer peripheral devices. Appropriate program elements are known to those skilled in the art, and need not be described in detail herein.

Any of the devices described herein (e.g., a gaming device, computing device, player tracking module) may be operable to receive instructions from a computer readable medium. The term "computer-readable medium" as used herein refers to any medium that participates in providing instructions to the processor of the device for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Transmission media include coaxial cables, copper wire and fiber optics, including the wires that comprise a system bus coupled to the processor. Transmission media may carry acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying one or more sequences of one or more instructions to a processor of a device for execution. For example, the instructions may initially be borne on a magnetic disk of a remote computer. The remote computer can load the instructions into its dynamic memory and send the instructions over a telephone line using a modem. A modem local to a gaming device (or, e.g., a server) can receive the data on the telephone line and use an infrared transmitter to convert the data to an infrared signal. An infrared detector can receive the data carried in the infrared signal and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of carrier waves that carry data streams representing various types of information. Thus, a device may obtain instructions in the form of a carrier wave.

According to an embodiment of the present invention, the instructions of a program may be read into a main memory from another computer-readable medium, such from a ROM. Execution of sequences of the instructions in program causes processor perform the process steps described herein. In alternate embodiments, hard-wired circuitry may be used in place of, or in combination with, software instructions for implementation of the processes of the present invention. Thus, embodiments of the present invention are not limited to any specific combination of hardware and software. As discussed with respect to aforementioned systems, execution of sequences of the instructions in a program of a peripheral device in communication with a gaming device may also cause the processor of the gaming device to perform some of the process steps described herein.

The data storage device 340 may store one or more databases including, for example, a payout database 344 and a probability database 346. It should be noted that the data storage device 340 may further store any and all of the data and/or databases described with respect to computing device 200 (FIG. 2). The described entries of the databases represent exemplary information only; those skilled in the art will understand that the number and content of the entries can be different from those illustrated herein. Further, despite any description of the databases as tables, an object-based model could be used to store and manipulate the data types of the present invention and likewise, object methods or behaviors can be used to implement the processes of the present invention.

Where appropriate, a prior art probability database may be utilized in the performance of the inventive processes described herein. A probability database may be stored in the data storage device in tabular form, or any other appropriate database form, as is well known in the art. The data stored therein may include a number of exemplary records or entries, each defining a random number. Those skilled in the art will understand that the probability database may include any number of entries. The tabular representation may also define fields for each of the entries or records. The fields may specify: (i) a random number (or range of random numbers) that may be generated by the random number generator; and (ii) an outcome that indicates the one or more indicia comprising the outcome that corresponds to the random number of a particular record. A gaming device may utilize a probability database to determine, for example, what outcome corresponds to a random number generated by a random number generator and to display the determined outcome. The outcomes may comprise the three symbols to be displayed along the payline of a three-reel slot machine. Other arrangements of probability databases are possible. For example, the book "Winning At Slot Machines" by Jim Regan (Carol Publishing Group Edition, 1997) illustrates examples of payout and probability tables and how they may be derived. The entirety of this book is incorporated by reference herein for all purposes.

Further, where appropriate, a prior art payout database may be utilized in the performance of the inventive processes described herein. A payout database may be stored in the data storage device in tabular form, or any other appropriate database form, as is well known in the art. The data stored therein includes a number of example records or entries, each defining an outcome that may be obtained on a gaming device that corresponds to a payout. Those skilled in the art will understand that the payout database may include any number of entries. The tabular representation also defines fields for each of the entries or records. The fields specify: (i) an outcome, which indicates the one or more indicia comprising a given outcome; and (ii) a payout that corresponds to each respective outcome. The outcomes may be those obtained on a three reel slot machine.

A gaming device may utilize the payout database to determine whether a payout should be output to a player as a result of an outcome obtained for a game. For example, after determining the outcome to output on the gaming device, the gaming device may access the payout database to determine whether the outcome for output is one of the outcomes stored as corresponding to a payout. If it is, the gaming device may provide the corresponding payout to the player.

Other arrangements of payout databases are possible. For example, the book "Winning At Slot Machines" by Jim Regan (Carol Publishing Group Edition, 1997) illustrates many examples of payout and probability tables and how they may be derived.

Note that, although some particular databases may be described as being stored in a gaming device, in other embodiments of the present invention some or all of these databases may be partially or wholly stored in another device, such as one or more of the peripheral devices, the peripheral device server and/or the server computer. Further, some or all of the data described as being stored in the databases may be partially or wholly stored (in addition to or in lieu of being stored in the memory of the gaming device) in a memory of one or more other devices, such as one or more of the peripheral devices, another gaming device, a smart card, a floor controller 125 and/or the computing device 110.

Figure 4:
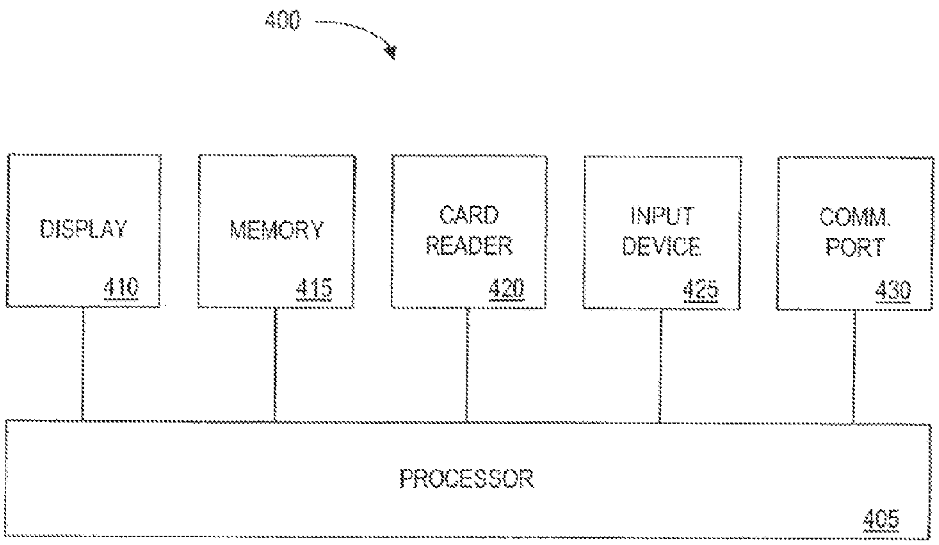
FIG. 4 is a block diagram of an example player tracking module, in accordance with one or more embodiments of the present invention.

Referring now to FIG. 4, illustrated therein is a block diagram of an embodiment 400 of an example player tracking module. For purposes of brevity, embodiment 400 is referred to herein as player tracking module 400. The player tracking module 400 comprises a processor 405 for controlling the operations of the player tracking module 400. The processor 405 is operable to communicate with a variety of sub-components of the player tracking module. It should be noted that the player tracking module may comprise conventional components in addition to those pictured (e.g., one or more serial expansion ports, a serial display circuit, a bus interface logic, etc.).

Processor 405 is operable to communicate with a display 410. Display 410 comprises a display operable to display text or other messages to a player. For example, display 410 may be operable to display to a player an indication of a current rate at which the player is earning reward points, an indication of a rate a player may potentially qualify for (along with, in one embodiment, an indication of how the player may qualify for the rate), and/or an indication of one or more actions the player is required to perform in order to maintain and/or achieve a particular rate of earning reward points or other increased level of reward. The display 410 may comprise, for example, a vacuum fluorescent display organized as a 16×19 display matrix. In another embodiment, the display 410 may comprise a Liquid Crystal Display (LCD). In one or more embodiments, the display 410 may also function as an input device of the player tracking module (e.g., the display 410 may comprise a touch-screen).

The processor 405 may further be operable to communicate with a memory 410. Memory 410 may comprise, for example, SRAM or another type of memory operable to store the variables and parameters necessary for the processor 405 to communicate with the various sub-components of the player tracking module 400 as well as other devices.

The processor 405 may further be operable to communicate with a card reader 420. Card reader 420 may comprise, for example, a plastic bezel having a card reader opening formed therealong for receiving a card therein. The card reader may include guide rails disposed at opposite, respective lateral ends of the opening, for guiding the card through the opening. The card reader may also include additional conventional components (e.g., a printed circuit board, photodiodes, photodetectors, a light mask, etc.) as would be understood by one of ordinary skill in the art. The processor 405 may be operable to detect whether a player tracking card has been inserted into or removed from the card reader 420, in a manner known in the art. The card reader 420 may comprise an optical card reader, a magnetic card reader, a bard code reader, and/or a reader of any other type of appropriate type of card.

The processor 405 may further be operable to communicate with an input device 425. Input device 425 may comprise, for example, any device via which a player or other person may input information to the player tracking module 400. For example, the input device 425 may comprise a keypad or touchscreen. In one embodiment, an offer or other message requiring a player response may be output to a player via a player tracking module 400. In such an embodiment, the player may respond to the offer or other message using the input device 425.

The processor 405 may further be operable to communicate with a communication port 430. The communication port 430 may comprise a means via which the player tracking module may communicate with one or more other devices (e.g., a data communication module, a floor controller, a computing device, or a combination thereof).

Databases

Referring now to FIG. 5, illustrated therein is a tabular representation 500 of an example player database 220. The tabular representation 500 of the example player database includes a number of example records or entries, each defining a player who may be a member of a loyalty club of a casino or otherwise registered with or known to a casino or other entity implementing aspects of the present invention. Those skilled in the art will understand that the player database may include any number of entries. The tabular representation 500 also defines fields for each of the entries or records. The fields specify: (i) a player identifier 510 that uniquely identifies a player, (ii) a name 520 of a player, (iii) a financial account identifier 530 associated with a player, (iv) an indication of reward points 540 available to a player, (v) a reward point rate 550 the player currently qualifies for, (vi) a theoretical win 560, (vii) an actual win/[loss] 570 for a player, and (viii) an account balance 580.

Information in the player database 220 may be created and updated, for example, based on information received from a player, a casino employee, a gaming device 115, a floor controller 125 and/or a player tracking module 120. For example, the information may be created when a player registers with a casino and receives a player tracking card encoded with the player identifier. The information may be subsequently updated when a player requests to update the information (e.g., when a player indicates a desire to change an account identifier associated with the player) or when additional information is obtained about the player via the casino's interactions with the player. For example, a reward point rate the player currently qualifies for may be updated when the player qualifies for an improved rate based on game play activity during a play session or when a player becomes disqualified from an improved rate due to a lack of game play or other required activity. In another example, the lifetime theoretical win may be updated on an ongoing basis as the player plays games at a casino.

The player identifier 510 may be, for example, an alphanumeric code associated with a player who may operate a gaming device or play a table game at a casino. The player identifier 510 may be generated or selected, for example, by the computing device 110 or by the player (e.g., when a player first registers with a casino). For each player, the player database 220 may also store the player's name 520 (e.g., for use in outputting messages to the player). In one or more embodiments the player's name may comprise a nickname or other designation for the player that is selected by the player or the casino. In one or more embodiments, the nickname may comprise a designation that reflects the player's status (e.g., "premium player"). Such a status may indicate, for example, the typical spending range of the player or other indication of how valuable the player is considered to be by the casino. Such a designation may or may not be known to the player.

The financial account identifier field 530 (e.g., a credit card account number, a debit card account number, a checking account number, a casino financial account number, or digital payment protocol information) identifies a financial account associated with the player. The financial account identifier 530 may be used, for example, to credit a payment to the player (e.g., wherein a benefit obtained by the player comprises a monetary amount) and/or to debit a wager amount.

The reward points field 540 stores an indication of the number of reward points that a player is currently entitled to. In accordance with embodiments of the present invention, the reward points field 540 stores the reward points earned by a player in accordance with the methods of the present invention.

The reward points rate field 550 stores an indication of the rate of earning reward points, or other algorithm for calculating reward points to be provided to the player, currently associated with the player based on the player's activities. For example, the reward points rate field 550 may store an indication of the current rate at which the player is earning rewards during a play session, based on the player's play during the play session up to the current time. Many different exemplary rates and methods by which a player may qualify for a rate or other algorithm for determining rewards are described in detail herein.

The theoretical win/560 stores an indication of the theoretical win of the player based on the playing activity of the player since the playing activity of the player has been tracked. In other words, the historical theoretical win 560 may be a "lifetime" theoretical win. In other embodiments a historical theoretical win based on other periods of time may be stored in addition to or instead of the lifetime historical theoretical win. For example, an annual or session theoretical win may be stored. The actual win/[loss] 570 stores an indication of the actual dollar amount that the corresponding player has won or lost while gambling at the casino. A loss is indicated in brackets in the tabular representation 500.

In one embodiment, a player may qualify for a more beneficial rate of earning reward points based on a theoretical win and/or on a historical win associated with the player.

It should be understood that although a player identifier and information related to each registered player is described in detail, a player need not be registered in order to obtain benefits of the present invention (e.g., qualify for a more beneficial level of rewards based on continued performance of an activity). For example, in one embodiment any player playing a gaming device, irrespective of whether the player is a member of a casino loyalty club, may qualify for a free game play or other bonus if the player continues to play the gaming device for at least a predetermined length of time. In another example, a player may qualify for a decreased wager amount per game play if the player continues to play a gaming device for a predetermined length of time or a predetermined number of consecutive game plays. Accordingly, registration of a player and storing of information related to a player is not necessary for practice of the present invention.

Referring now to FIG. 6, an exemplary tabular representation 600 illustrates one embodiment of the gaming device database 225 (FIG. 2) that may be stored in the computing device 200. The tabular representation 600 of the gaming device database includes a number of example records or entries, each defining a gaming device that may be operable to communicate with (e.g., over a LAN or WAN) with computing device 200. Those skilled in the art will understand that the gaming device database may include any number of entries. The tabular representation 600 also defines fields for each of the entries or records. The fields specify: (i) a gaming device identifier 610 that uniquely identifies a particular gaming device (e.g., uniquely identifies a particular slot machine on a casino floor or a PC communicating with an online casino), (ii) a gaming device type 620 that stores a description or designation of the type of gaming device, and (iii) a gaming device location 630.

In one embodiment, a gaming device operable to carry out one or more methods of the present invention may comprise a personality board. A personality board may uniquely identify the gaming device to the network on which the gaming device is located. For example, the personality board may function to indicate the type of gaming device (e.g., via a six bit binary configuration number) and a unique gaming device identifier that a host computer (e.g., a floor controller 125 and/or a computing device 110) may use to uniquely identify the gaming device. For example, a personality board may couple the data communication module 332 to a gaming device. The configuration number and/or the unique gaming device identifier may be utilized by a host computer (e.g., a floor controller 125 and/or computing device 110) to maintain records associated with the gaming device.

The gaming device database may be used by computing device 200 to, for example, communicate with one or more gaming devices and to identify a gaming device that data is being transmitted to or received from. For example, the computing device 200 may instruct a gaming device to output a message to a player of the gaming device that the player has qualified for an increased rate of earning reward points, transmit a random number to the gaming device, and/or update information in one or more databases of the gaming device. Similarly, the computing device 200 may receive information associated with a player of the gaming device (e.g., a player identifier, player preferences, an indication of wagers placed or number of games played by a player, an indication of duration of play by a player at the gaming device, an indication of game plays initiated and/or completed at the gaming device, an indication of a rate of play of the gaming device, etc.). Some or all of the information received from a gaming device and/or transmitted to a gaming device may be stored in association with the gaming device in the gaming device database. In one or more embodiments, some or all of the information received from a gaming device and/or transmitted to the gaming device may be stored in association with a record of a play session in the play session database, as described below with respect to FIG. 7.

The gaming device type field 620 stores an indication of a type of gaming device (e.g., a six bit binary configuration number or a textual description of the gaming device). Such information may be used, for example, to determine whether a player has qualified for a higher level of reward. For example, in one embodiment it may be desirable to allow a player to qualify for higher level of reward by playing a specified type of gaming device. For example, it may be desirable to encourage a player to play a new type of device available at the casino, a type of gaming device previously not played by the player, a type of device underutilized at the casino, etc. Accordingly, a player may be informed that if the player plays the specified type of gaming device (e.g., for a predetermined minimum period of time or minimum number of game plays), the player will qualify for a higher level of reward points. For example, the player may qualify for an increased rate at which reward points are earned (e.g., triple reward points). The player may earn reward points at the increased rate while playing the specified type of gaming device and/or after playing the specified type of gaming device (e.g., for one hour after playing the specified type of gaming device). In such embodiments, it may be determined whether the player qualifies for the increased level of reward by determining the gaming device identifier of a gaming device the player is playing and determining whether the gaming device identifier corresponds to the specified type of gaming device.

A player may be encouraged to play a specified gaming device in a similar manner. For example, a player may be informed that the player can earn double reward points by playing a specified gaming device for at least ten game plays.

The gaming device location 630 stores an indication of where a particular gaming device is located. Such information may be used, for example, to determine whether a gaming device at which a player is playing is within a predetermined distance from another gaming device. For example, in one embodiment it may be desirable to instruct a player to end playing the gaming device and begin playing at another gaming device. A player may be motivated to do so, for example, by outputting a message to the player that if the player begins playing the other specified gaming device, the player will begin earning double reward points (or some other increased level of reward).

Referring now to FIG. 7, an exemplary tabular representation 700 illustrates one embodiment of the play session database 230 (FIG. 2) that may be stored in the computing device 200. The tabular representation 700 of the play session database includes a number of example records or entries, each defining a play session of a player that is being tracked or that had been tracked by a device such as computing device 200. Those skilled in the art will understand that the play session database may include any number of entries. The tabular representation 700 also defines fields for each of the entries or records. The fields specify: (i) a play session identifier 710 that uniquely identifies a particular play session; (ii) a player identifier 720 that uniquely identifies the player participating in the corresponding play session; (iii) a start time 730 that indicates a time at which the corresponding play session began; (iv) an end time 740 that indicates a time at which the corresponding play session ended; (v) a status 750 of the play session; (vi) a current gaming device 760 being played, if any; (vii) a current reward point rate 770 at which reward points are being awarded to the player; (viii) a current rate of play 780 at which the player is playing the gaming device; and (ix) reward points earned 790 that indicates a total number of reward points earned to date during the corresponding player session.

Of course, in one or more embodiments a play session database may store further details regarding a play session. For example, a play session may store data for each game play initiated and/or completed during the play session. Such data may include, for example, a time at which the game play was initiated, an outcome of the game play, an amount wagered on the game play, a number of paylines activated for the game play, an indication of whether a bonus round was qualified for and/or won during the game play, etc.

The play session identifier 710 may be generated by a device (e.g., computing device 110, a floor controller 125, or a gaming device 115) upon a beginning of a gaming session by a player. In one embodiment, a player may provide a unique play session identifier (e.g., by providing a personal identification number (PIN) for the play session).

The player identifier 720 may store an indication of a player tracking card identifier (e.g., as read from a player tracking card reader or smart card reader of a gaming device). In some embodiments, a player need not be uniquely identified for purposes of earning a higher level of reward. Accordingly, in such embodiments a player identifier may not be stored in association with a play session. For example, in one embodiment a player may earn an increasing level of reward that is applied to the current play session (e.g., a progressively lower maximum bet amount, a progressively higher payout, a progressively more beneficial probability schedule, etc.). Accordingly, there may not be a need to identify the player because the increased level of reward may only be applied to the player while the player is playing the current gaming device during the current play session. In another embodiment, a player may gain access to an earned level of reward by providing a play session identifier, without having to provide a player identifier.

The start time 720 may store a time (e.g., time of day, week, month, and/or year) of a play session. As described herein, in one embodiment, a beginning of a player session may be signified by an insertion of a player tracking card into a player tracking module of a gaming device. In one embodiment, a player may provide an indication in addition to inserting a player tracking module that the player desires to begin a player tracking session. A player may or may not be prompted for such an indication. In one embodiment, a beginning of a player session may be signified by an initiation or completion of a game play on a gaming device. In one embodiment, a beginning time of a play session may be signified by a casino employee (e.g., a casino employee on the casino floor, such as a pit boss or table game dealer, or a casino employee checking the patron into a casino hotel).

As described herein, in one embodiment a casino patron may earn, during a duration of a play session, increasing levels of reward (e.g., increased rates at which reward points are earned). Accordingly, it may be desirable to determine a beginning point from which the patron's activities are monitored to determine whether the patron qualifies for an increased level of reward. Such a beginning point of monitoring may be referred to as a start time of a play session herein.

It may further be desirable to determine an end time of a play session, thus determining a time after which the patron's activities are no longer relevant to determining whether the patron qualifies for an increased level of reward. It should be noted, however, that the patron's activities after the end time of the play session may be relevant to determining whether the patron qualifies for an increased level of reward during a subsequent play session.

An end time of a play session may be determined in a variety of manners. For example, an end time of a play session may be determined as the time of completion of a game play after which another game play is not initiated for more than a maximum period of time. In another example, an end time may be determined based on the occurrence of one or more predetermined events. For example, a removal of a player tracking card reader of a player tracking module of a gaming device may signify an end of a play session. In another example, a checking out of a casino hotel may signify an end of a play session. In yet another example, an occurrence of a predetermined time (of day, week, month or year) may signify an end of a play session. In yet another example, an indication by the patron associated with the play session may signify the end of the play session (e.g., the player may actuate an "end play session" or "cash out" button of a gaming device or may answer affirmatively a prompt inquiring as to whether the player is ending a play session). In still another example, a player's movement away from a gaming device may signify an end of a play session. For example, a pressure sensor in a seat associated with the gaming device may detect that the player has gotten up from the seat or a camera associated with the gaming device may detect that the player has left the vicinity of the gaming device. In yet another example, an end time of a play session may be determined by a casino employee and entered into a computing device. For example, a casino hotel employee may enter into a computer system an indication that the patron associated with the play session has checked out of the hotel or a pit boss or table game dealer may enter into a computer system an indication that the player has ended a play session.

In one embodiment, an occurrence of a disqualifying condition may signify the end of a play session. For example, if a player fails to initiate a game play or perform another activity within a maximum period of time from a last initiated game play or other qualifying activity, it may be determined that the play session has ended as of the last initiated game play. In another example, if a player's rate of play is not maintained above a minimum rate of play, the play session may be determined to have ended as of the time at which the player's rate of play dipped below the minimum rate of play.

In one embodiment, the end time 740 may store an expected end time of a play session that is currently in progress. For example, in an embodiment in which a play session comprises the duration of a player's stay in a hotel casino, the end time 740 may store a time at which the player is expected to check out of the hotel (or a predetermined time after the time at which player is expected to check out of the hotel). Of course, in embodiments in which the end time 740 stores an expected end time of a play session, the play session may be ended earlier than expected (e.g., if an occurrence of one or more disqualifying conditions is determined). For example, in one embodiment a play session may last for a week, so long as the player plays a gaming device for at least one hour each day of the week. If the player does not play a gaming device for at least one hour during the week, the play session may end early (e.g., it may end as of the last day that the player did play a gaming device for at least one hour).

The session status 730 indicates a current status of a play session. For example, the session status may indicate that the corresponding session is "in progress", is "on hold" or is "over". A session may be considered to be "in progress", for example, if a player is currently actively performing an activity (e.g., playing a gaming device) that may qualify the player for a higher level of reward (e.g., an increased rate of earning reward points). A session may be considered "on hold", for example, if a player is not currently performing such an activity but it has been determined that the player intends to return to performing the activity within a predetermined time period. For example, in one embodiment a player may be allowed to "pause" a play session (e.g., in order to get a snack, see a show, get some sleep, use the facilities, obtain more money, etc.). For example, a player may be allowed to pause a play session for a predetermined maximum duration of time, after which time the play session may be considered to have ended if the player does not resume a qualifying activity. In one embodiment, a player may be required to provide consideration in exchange for the privilege of pausing a play session. In one embodiment, a play session may be automatically set to a status of "on hold" for a predetermined length of time after it is determined that a player is no longer performing a qualifying activity, to provide the player an opportunity to resume a qualifying activity within the predetermined length of time without losing the benefits of the play session.

A status of "over" may indicate that the play session has ended and cannot be resumed. Of course, in one or more embodiments a player may resume a play session that is classified as "over". For example, if the player provides consideration and/or performs a qualifying activity within a predetermined period of time, the play session may be considered to have been resumed and thus the status of the play session may be changed to "in progress". Other statuses besides those illustrated may be employed, as appropriate.

The current gaming device field 760 may store an identifier and/or other information associated with a gaming device currently being played by the player associated with the play session. Of course, as described herein, activities other than play of a gaming device may qualify a casino patron for an increased level of reward. Accordingly, an indication of an activity other than play of a gaming device may be stored in the play session database. For example, an indication of a table game currently being played by a player may be stored.

The current reward point rate 780 stores an indication of a rate of reward points at which the player associated with the corresponding gaming session is currently qualified to earn reward points. Of course, in embodiments in which a player earns increased reward levels other than a rate of rewards, the field 780 may store an indication of the level other than a rate that a player is currently qualified for. The current reward points rate 780 may be updated as a player qualifies for an increased rate.

In one embodiment, the current reward point rate field 780 may store a formula or algorithm used to calculate a number of reward points to be awarded to the player, as illustrated in table 700. In another embodiment, the current reward point rate field 780 may store another indication of a rate or level of reward that a player is qualified to receive. For example, an identifier corresponding to a rate, formula or algorithm may be stored. The identifier may then be used to retrieve the appropriate rate, formula or algorithm (e.g., from another table or memory), when it is time to determine a number of reward points or other reward to be awarded to a player.

In one embodiment, the reward point rate field 770 may store an indication of the final reward point rate that a player qualified for at the end of a play session.

The current rate of play field 780 stores an indication of a current rate at which a player is playing a game (e.g., in terms of number of game plays per unit of time, such as number of game plays per hour). As described herein, in one or more embodiments a player may be required to achieve a minimum rate of play in order to remain qualified for a particular rate of earning reward points. Accordingly, the player's current rate of play may be monitored and stored in the play session database. The current rate of play may be retrieved and compared to a minimum required rate of play when it is time to determine a number of reward points to be awarded to a player, to determine whether the player qualifies for a particular rate of earning reward points. In one embodiment, an average rate of play may comprise the current rate of play. The average rate of play may comprise, for example, an average rate of play as calculated over the entirety of the play session to date or over a specified portion of the play session (e.g., the portion of the play session since the player qualified for the current rate of earning reward points).

The reward points earned field 790 stores an indication of reward points earned during the corresponding player session. The reward points earned field 790 may be updated, for example, each time additional reward points are calculated for and awarded to the player. For example, in one embodiment a number of reward points to be provided to a player of the player session are calculated at the completion of each game play. In another example, a number of reward points to be provided to a player of the corresponding player session are calculated periodically (e.g., at each half-hour interval, the reward points earned during the previous half-hour are calculated).

Processes

As described herein, in one or more embodiments methods of awarding reward points or other rewards to a casino patron on an escalating basis are provided. For example, in one embodiment the longer a player remains at a gaming device, the greater the rate at which he qualifies to earn reward points. For example, in his first hour of play, a player may earn reward points at a rate of one reward point for every dollar wagered. In his second hour of play, the player may qualify to earn reward points at an increased rate of two reward points for every dollar wagered. In his third hour of play, the player may qualify to earn reward points at a still increased rate of three reward points for every dollar wagered, and so on. As described herein, reward points may be redeemed for cash, merchandise, or other prizes or benefits. A player is thereby encouraged to remain at a gaming device, since time already spent at the gaming device contributes to a greater rate of earning reward points.

In one embodiment, the rate at which a player earns reward points may depend on one or more factors, any one of which may serve as a proxy for time spent at a gaming device. These factors may include, for example:

(i) time spent at the gaming device;

(ii) number of game plays initiated or completed at the gaming device;

(iii) total number of paylines played at the gaming device;

(iv) total amount wagered at the gaming device;

(v) total amount paid out to the player as a result of game play at the gaming device;

(vi) net amount of player winnings;

(vii) net amount of player losses;

(viii) total number of a particular symbol that has occurred at one or more gaming devices (e.g., a player's rate of earning reward points may depend on the number of "cherry" symbols that have occurred at the gaming device since the start of the play session);

(ix) total number of a particular outcome that has been obtained by a player on one or more gaming devices (e.g., a player's rate of earning reward points may be increased based upon an occurrence of an outcome, such as four of a kind in video poker or table poker);

(x) the total number of times a player has entered a bonus round;

(xi) the player's current credit balance (e.g., a player may earn reward points at a greater rate the lower his credit balance, as a low credit balance may tend to indicate a long time spent at the gaming device). In one embodiment, the player's current credit balance may be compared with a reference balance (e.g., with the player's initial balance), and the player may earn reward points based on this difference;

(xii) the total number of reward points already earned by the player (e.g., during a play session);

(xiii) the theoretical win associated with the player;

(xiv) the total number of cards drawn in a video poker game;

(xv) activity of another player; and (xvi) the number of qualifying game plays initiated or completed at the gaming device (e.g., a player may earn reward points each time the player wagers the maximum allowed amount in association with a particular game play, or each time the player attains a particular type of outcome, and so on).

In one embodiment, reward points may be earned based on any of the above factors. For example, a player may earn a given number of reward points (depending on the current rate) for each dollar wagered. As another example, a player may earn a given number of reward points for every cherry symbol that occurs. As a third example, a player may earn a given number of reward points for every payline he plays. As a fourth example, a player may earn a given number of reward points for having lost ten dollars in the last five minutes. In each of these example, the rate of earning reward points may be expressed in a different way. Rates may be expressed for example, as reward points per dollar wagered, as reward points per "cherry" symbol to occur, as reward points per pay line played, and so on.

Thus, it should be noted that, in accordance with one embodiment, at least two parameters may govern the earning of reward points. The first is the rate at which a player will earn reward points (e.g., a player will earn two points per game play). This rate may depend on a number of factors described above. The second parameter is the actual event that earns reward points for the player (e.g., the player actually earns two reward points when he initiates a game play). To illustrate, suppose a player has played at a gaming device for half an hour, and has thereby achieved a rate of earning reward points equal to two reward points per game play. Now suppose the player initiates five game plays after qualifying for this rate. The player will earn, for the five game plays, ten reward points.

Figure 8:
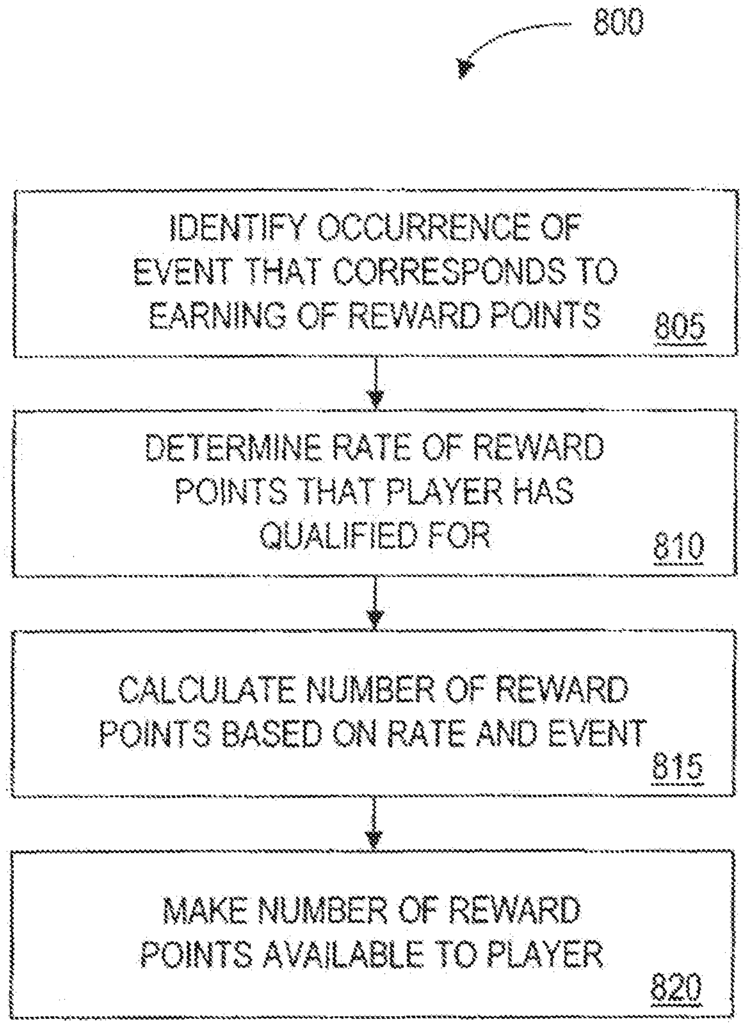
FIG. 8 is a flow chart illustrating an exemplary process according to an embodiment of the present invention.

Referring now to FIG. 8, a process 800 illustrates one method of awarding reward points to a casino patron. The process 800 may be performed, for example, by computing device 110, a floor controller 125, a gaming device 115, another device or a combination thereof. Process 800 is an example subroutine in which reward points are awarded to a player based on a current rate of earning reward points that the player currently qualifies for and an occurrence of an event that corresponds to an awarding of reward points.

In step 805 it is determined that an event that corresponds to an earning of reward points has occurred. In other words, it is determined that reward points are to be calculated for and awarded to a player.

In one embodiment, a device (e.g., computing device 110, a floor controller 125, and/or a gaming device 115) may store one or more predetermined events in memory, wherein an occurrence of at least one of the events may cause reward points to be calculated for and awarded to the player. Examples of such predetermined events include, but are not limited to, an initiation of a game play at a gaming device, a placement of a wager of a predetermined magnitude at a gaming device, provision of a payout as a result of an outcome at a gaming device, removal of a card from a player tracking module, and a purchase at a point-of-sale device.

In another example, step 805 may comprise determining that a time for calculating reward points has occurred. For example, in one embodiment, a player may be awarded reward points for every unit of time (e.g., an hour, a half-hour, five minutes, etc.) the player spends playing a gaming device. It should be noted that, in one embodiment, a unit of time may not be a predetermined unit but may instead be defined by other events, such as a number of game plays (e.g., reward points may be calculated and awarded to the player after every ten game plays initiated or completed by the player).

In an embodiment in which reward points are calculated and awarded to the player at the end of a unit of time, step 805 may comprise determining that the unit of time since the last calculation of reward points for the player, or since the beginning of a play session of the player, has past and that it is time to calculate reward points to be awarded to the player. For example, it may be determined that a half-hour has passed (or that the player has initiated or completed ten game plays) since the last calculation and awarding of reward points to the player.

In step 810 the rate of earning reward points that a player has qualified for is determined. In one embodiment, step 810 may comprise retrieving the rate that the player is currently qualified for from a database (e.g., from a player database or from a play session database). In another embodiment, the rate the player is currently qualified for may be determined based on activity of the player. For example, the player's activity since the last time during the current play session that reward points were calculated or since the beginning of the current play session may be determined. In a more particular example, if a player is awarded reward points for each unit of time during a play session, the player's activity during the unit of time that just ended may be determined. In one embodiment, a gaming device 115 or a component thereof (e.g., data communication module 332) may be operative to track and store (e.g., on a temporary basis) information related to the player's activity that is relevant to determining the rate of earning reward points that the player qualifies for. For example, the player's rate of play, average wager amount, number of game plays initiated or completed, time spent playing at the gaming device since the last awarding of reward points to the player, time since the beginning of the play session, and/or number of paylines played on average by the player may be tracked and considered in determining the rate of play the player qualifies for.

In one embodiment, a status of a player may be a basis upon which rate of earning reward points is determined. For example, a player with an associated status of "Gold Player" may qualify for a higher rate of earning reward points than a player with an associated "Silver Player" status. A status of a player may be determined based on various data associated with the player, such as the player's activity over a duration of time (e.g., since the player registered as a member of a casino loyalty club). For example, a player that typically places relatively large wagers, has generated substantial theoretical win, wagers often, and/or plays for long durations of time may be associated with a more beneficial status (i.e., a status that qualifies the player for relatively more favorable benefits) than a player who does not place such relatively large wagers, does not wager as often and/or does not play for long durations of time. In another embodiment, a status of a player may not be related to the player's gambling activity (e.g., a status indicates that a player is a "Hotel Guest").

In step 815, a number of reward points to be awarded to a player are calculated based on the rate determined in step 810 and the event determined in step 805. For example, assuming the event is a game play and the rate is two reward points per game play, step 815 may comprise calculating two reward points to be awarded to the player. In one embodiment, calculating a number of reward points may further include determining a number of events upon which the rate is based. For example, assume that the rate is 0.5 reward points/game play*number of game plays initiated within the last half-hour, wherein the event that causes the calculation, determined in step 805 is the determination that a half hour has passed since the last calculation of reward points for the player. Further assume that the player has played 180 game plays in the last half hour. Accordingly, step 815 may comprise calculating that the player is to be awarded 90 reward points (180*0.5=90).

In one or more embodiments, one or more additional requirements may need to be satisfied in order for a player to be awarded reward points at a rate the player has qualified for. For example, a player's rate of play may need to be at least a minimum rate of play (e.g., an average minimum rate of play) in order for the player to be awarded reward points at a particular rate. In another example, a player may be required to place a wager of at least a predetermined magnitude for each relevant game play (i.e., each game play relevant to the current calculation of reward points) or for a predetermined minimum number of such relevant game plays. In another example, a player may be required to play a minimum number of paylines, or specified paylines, in order to be awarded reward points at a rate the player has qualified for.

As described herein, in one embodiment, only qualifying game plays may contribute to a player (i) qualifying for an increased rate of earning reward points, (ii) being awarded reward points at a particular rate, and/or (iii) remaining entitled to a particular rate of earning reward points. For example, in order to qualify for an increased rate of play, a player may be required to complete one hundred qualifying game plays. A qualifying game play may comprise a game play that satisfies one or more requirements associated with the player's qualification for the increased rate of play. Examples of such requirements include, but are not limited to:

(i) a specified, minimum or maximum wager amount being placed on the game play;
(ii) a specified, minimum or maximum number of paylines being played during the game play;
(iii) the game play being played less than a specified or maximum time from a time at which a prior game play was played;
(iv) a player tracking card being inserted and/or remaining inserted into the gaming device being played, during the game play;
(v) a minimum credit balance being maintained prior to and/or subsequent to the placement of the wager for the game play;
(vi) a player not cashing out for a minimum amount of time subsequent to a completion of the game play;
(vii) a payout corresponding to the game play being less than a predetermined amount;
(viii) a payout corresponding to the game play being more than a predetermined amount;
(ix) a specified strategy being employed during the game play;
(x) the game play including entry into a bonus round;
(xi) the game play resulting in one or more predefined outcomes (e.g., an outcome of "cherry-cherry-cherry", a winning outcome, a non-winning outcome, an outcome having a predefined characteristic, etc.);
(xii) the game play resulting in an outcome that includes a predefined symbol;
(xiii) the game play occurring during a predetermined time (e.g., of day, week, month, or year);
(xiv) the game play occurring during a predetermined duration of time;
(xv) the game play occurring within a predetermined time of a predefined event;
(xvi) the game play occurring on a predefined gaming device;
(xvii) the game play occurring on a predefined type of gaming device; and
(xviii) the game play occurring on a gaming device located in a predefined location of a casino.

It should be noted that, in one or more embodiments, a player may be required to satisfy one or more requirements such as the requirements described above order to maintain a rate of earning reward points.

In embodiments in which a player is required to satisfy one or more requirements in order to be awarded reward points at a rate the player has qualified for, process 800 may further include a step of determining whether the requirements associated with the rate for which the player has qualified for have been satisfied. The process 800 may include such a step before any step of calculating reward points for the player.

In one or more embodiments, if a player fails to meet such one or more requirements associated with a rate of earning reward points that the player has qualified for, the player may be awarded reward points at a reduced rate or at a default rate.

In one or more embodiments, a device (e.g., computing device 110, a floor controller 125, and/or a gaming device 115) may store in memory a plurality of rates, and any requirements associated with each of the rates. As described, the requirements may comprise requirements to be satisfied in order for the corresponding rate to be used to calculate reward points for a player and/or requirements to be satisfied in order for a player to retain eligibility for the corresponding rate. In one embodiment, one or more requirements (e.g., as determined by a casino operator or gaming device manufacturer) may be associated with all rates (or all rates other than a base rate).

In one or more embodiments, a rate of earning reward points may vary continuously as a function of time, handle pulls, or some other factor. For example, a rate of earning reward points may be expressed by the equation:

$$\text{Rate}=(0.01\text{ reward point}/(\text{game play})^2)*(\#\text{ of game plays completed this session})$$

In the equation above, it can be readily seen that the rate, expressed in reward points per game play, increases for every increase in the number of game plays initiated or completed in the current session. Thus, for example, after 100 game plays have been initiated or completed in a session, the rate will be equal to 1 reward point per game play. After 101 game plays have been completed, the rate will be equal to 1.01 reward points per game play.

The actual number of reward points earned in a session may be derived by $$\begin{aligned}\text{Reward points earned} &= (\text{Rate prior to first game play})*(1\text{ game play}+\\ &\quad \text{Rate prior to second game play})*\\ &\quad (1\text{ game play}+\ldots+\\ &\quad \text{Rate prior to }N^{th}\text{ game play}*\\ &\quad 1\text{ game play})\\ &= 0*1+0.01*1+0.02*1+\ldots+(N-1)*0.01*1\\ &= 0.01*(1+2+\ldots+N-1)\\ &= 0.01*(N-1)*N/2\end{aligned}$$

Where N is the number of the most recent game play in the session.

Accordingly, if there have been 100 game plays in the session (N=100), then the total number of reward points earned thus far would be 0.01*99*100/2=49.5. It should be noted that in some circumstances (e.g., if a player were to quit the session after 100 game plays) a fractional reward point would be due to be awarded to the player. In various embodiments, the fractional reward point might be rounded up, rounded down, or retained as a fraction.

Several further exemplary equations expressing a rate of earning reward points in dependence upon other factors are illustrated below:

$$\text{Rate}=0.5\text{ reward point}/(\text{game play}*\text{hour})*\#\text{ of hours played this play session} \quad \text{(i)}$$

$$\text{Rate}=0.1\text{ reward point}/(\text{game play}*\text{hour})*\#\text{ of game plays completed this play session} \quad \text{(ii)}$$

$$\text{Rate}=0.03\text{ reward point}/(\text{cherry symbol obtained})^2*\#\text{ cherry symbols obtained this play session} \quad \text{(iii)}$$

It should be noted that a rate of earning reward points may also be a stepwise function of time, game plays, or some other factor. For example, a rate of earning reward points may be expressed by the function:

$$\text{Rate}=\text{Trunc }(60\text{ reward point/hour}^2*\#\text{ of hours played this session})$$

Where "Trunc" is a function that truncates (rounds down) any fractional part of its argument. Thus, in the first minute of play, the rate will be equal to the truncation of a quantity that is less than: (60 reward point/hour$^2$)*(1/60 hours). In other words, the rate will be equal to the truncation to a quantity that is less than one (1) reward point per hour. Thus, during the first minute of play, the rate will be zero. During the second minute of play, the rate will be one (1) reward point per hour. During the third minute of play, the rate will be two (2) reward points per hour, and so on. It may be appreciated that the increments of time during which a rate remains constant may be made arbitrarily small. For example, a rate may increase after every minute, every second, every tenth of a second, and so on.

Many other algorithms and methods for awarding reward points on an increasing basis, where the rate of earning reward points increases if a player satisfies certain corresponding requirements, will be appreciated by one of ordinary skill in the art upon a reading of the present disclosure. A casino operator or other entity practicing aspects of the present invention may create or implement any method of awarding reward points on an increasing basis in accordance with the spirit and scope of the present invention, wherein the rate of earning reward points increases as a player performs or continues to perform any activity deemed beneficial to the casino operator or other entity in a manner specified by the casino as a pre-requisite to qualifying for the increase in the rate.

Many different factors have been described herein as a basis on which a rate of earning reward points may be increased (e.g., time spent at a gaming device, continuous game plays played at a gaming device, a rate of play maintained at a gaming device). Of course, the factors described herein are exemplary only and many other factors are within the spirit and scope of the present invention. For example, in one or more embodiments, a player may be required to play at several different gaming devices, types of gaming devices, or play different games in order to achieve an increased rate of earning reward points. For example, a player must spend at least half an hour at each of a Wheel of Fortune® machine, a Monopoly® machine, a Battleship® machine, and a video poker machine, in order to achieve a higher rate of earning reward points. In this way, a player may be encouraged to sample particular or different gaming devices or games at a casino.

It should be noted that, in one embodiment, only a subset (e.g., one) of the factor(s) described herein based on which a player may qualify for an increased rate of earning rewards may be implemented by a casino operator or other entity. Additionally, in one embodiment, different factors may correspond to different players, different statuses of players, different gaming devices, different types of gaming devices and/or different games or other activities available in a casino. For example, a casino operator may elect to implement an embodiment in which a player may earn an increased rate of earning reward points based on a first factor (e.g., time spent playing a gaming device) for a first type of gaming device (e.g., a reeled slot machine) and in which the player may earn an increased rate of earning reward points based on a second factor (e.g., rate of play maintained and number of game plays completed) for a second type of gaming device (e.g., a video poker gaming device). It should further be noted that, in one embodiment, a player may be allowed to select one or more factors based on which the player is attempting to qualify for an increased rate of earning reward points. For example, a player may be allowed to select (e.g., when joining a casino loyalty club, beginning a play session, or another time) whether the player would prefer to attempt to qualify for an increased rate of earning reward points based on time spent at a gaming device, a number of contiguous game plays completed on a gaming device, and/or another factor. Of course, in one embodiment, the relative magnitude at which a rate may increase may vary based on the factor that is determinative of the increase.

Additionally, many different events have been described herein as events for which reward points may be awarded to a player (e.g., game play initiated or completed, occurrence of a symbol, monetary unit wagered, payline played), at a rate the player has qualified for. Of course, the events described herein are exemplary only and many other events are within the spirit and scope of the present invention. It should be noted that, in one embodiment, only a subset (e.g., one) of the events described herein may be implemented by a casino operator or other entity as events for which reward points are awarded. Additionally, in one embodiment, different events may correspond to different players, different statuses of players, different gaming devices, different types of gaming devices and/or different games or other activities available in a casino. For example, a casino operator may elect to implement an embodiment in which a player may be awarded reward points at the currently applicable rate for each occurrence of a first event (e.g., each dollar wagered) at a first type of gaming device (e.g., a reeled slot machine) and in which the player may be awarded reward points at the currently applicable rate for each occurrence of a second event (e.g., each game play initiated) for a second type of gaming device (e.g., a video poker gaming device). It should further be noted that, in one embodiment, a player may be allowed to select one or more events for which the player is to be awarded reward points at the applicable rate. For example, a player may be allowed to select (e.g., when joining a casino loyalty club, beginning a play session, or another time) whether the player would prefer to be awarded reward points for each game play initiated, for each dollar wagered, each occurrence of a particular symbol as part of an outcome at a gaming device and/or another event. Of course, in one embodiment, the rate of earning reward points or other algorithm based on which reward points are awarded may vary based on which one or more events reward points are to be awarded for.

Returning now to process 800, after the number of reward points to be awarded are calculated, the reward points are made available to the player in step 820. Making the reward points available to the player may comprise adding the number of reward points to a previous number of reward points awarded to the player. For example, step 815 may comprise adding the reward points to the total of reward points in the player's record of the player database. In one embodiment, step 815 may comprise outputting a message to the player, informing the player of the number of reward points being made available to the player. For example, a message may be output to the player via a player tracking module display or other display associated with a gaming device being played by the player.

As described herein, in one or more embodiments a player may be required to satisfy one or more requirements in order to maintain qualification for an increased rate of earning rewards. For example, the player may be required to maintain a minimum rate of play in order to remain qualified for a particular rate of earning reward points. In another example, if a player discontinues performing an activity that qualifies the player for a particular rate of earning reward points (e.g., discontinues playing a gaming device or a table game), the player may be required to perform a qualifying activity (e.g., beginning to play a gaming device or table game, making a purchase with a merchant associated with the casino, etc.) within a predetermined period of time from the discontinuance. In embodiments in which a player is required to satisfy one or more requirements in order to remain qualified for a particular rate, the player's failure to satisfy the one or more requirements may result in the player being no longer qualified for the rate. For example, the rate associated with the player may be changed to a default rate (e.g., a starting rate from which the player may again earn increased rates) or to a decreased rate. In one or more embodiments, the rate the player is qualified for continues to decrease at a predetermined rate until the player performs an action that causes the decrease in rate to stop or until the rate reaches a predetermined rate.

For example, assume a player began a gaming session with an associated rate of earning reward points of 0.2 reward points per game play. Further assume that the player ends the gaming session (or pauses the gaming session) after qualifying for an increased rate of earning reward points at the rate of 1 reward point per game play. In one embodiment, the player may remain qualified for the increased rate of one reward point per game play so long as the player begins playing a qualified gaming device (e.g., a gaming device having one or more predefined characteristics) within a predefined period of time (e.g., one hour) of ending or pausing the gaming session. In one embodiment, a player may have a choice of two or more activities to perform, the performance of any one of which may result in the player remaining qualified for a particular rate of earning reward points.

In one embodiment, if the player fails to begin playing a qualified gaming device (or fails to perform another qualifying activity) within the predefined period of time, the rate of earning reward points associated with the player may be set to a default rate (e.g., the rate of 0.2 reward points per game play that the player began the gaming session with). In another embodiment, rather than being set to a default rate, the rate may begin to be decreased after the predefined period of time has passed. The rate may begin to be decreased, for example, by a predefined amount per unit of time until a minimum rate is reached. For example, in the present example the rate may begin to be decreased by 0.2 reward points per game play for each fifteen minutes past the one hour, until the rate reaches a minimum rate of 0.2 reward points per game play. The player may cause the decrease in the rate to stop by performing one or more qualifying activities. For example, if the player begins to play a qualifying gaming device one hour and fifteen minutes after pausing the gaming session, the player will be entitled to a rate of 0.8 reward points per game play. If the player begins to play a qualifying gaming device one and a half hours after pausing the game play, the player will be entitled to a rate of 0.6 reward points per game play. If the player begins to play a qualifying gaming device on hour and forty-five minutes after pausing the gaming session, the player will be entitled to a rate of 0.4 reward points per game play. Finally, if the player begins to play a qualifying gaming device two hours or more after pausing the gaming session, the player will be entitled to a rate of 0.2 reward points per game play.

In one or more embodiments, the rate at which a rate decreases may be based upon one or more characteristics associated with the player (e.g., a status associated with the player) or another factor. For example, if the status associated with the player is a first status, in the above example the rate may decrease by 0.2 reward points per unit of time but if the status associated with the player is a second status, the rate may decrease by 0.1 reward points per unit of time. In another embodiment, the unit of time per which the rate decreases may be based upon a characteristic associated with the player or another factor.

Figure 9:
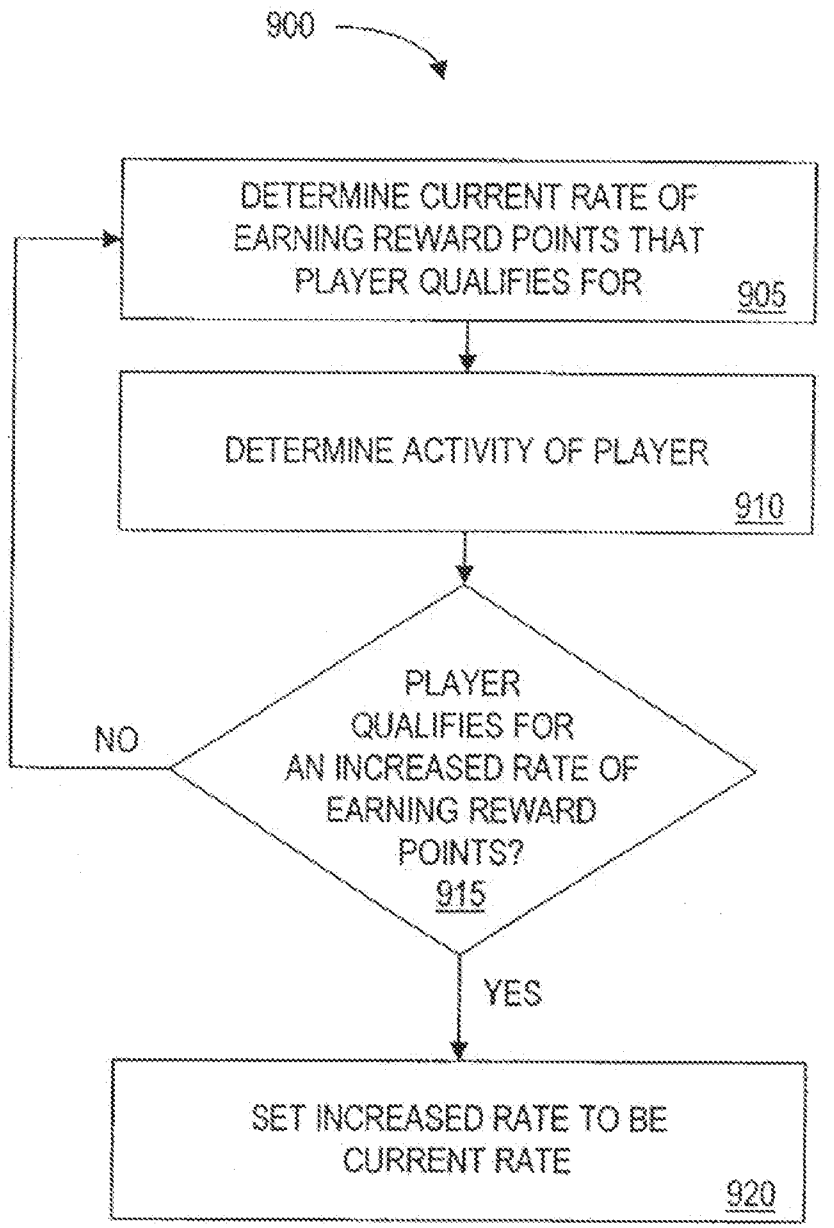
FIG. 9 is a flow chart illustrating an exemplary process according to an embodiment of the present invention.

Referring now to FIG. 9, illustrated therein is a process 900 in accordance with one or more embodiments of the present invention. Process 900 may be performed by, for example, computing device 110, a floor controller 125, a gaming device 115, another device or a combination thereof. Process 900 is a subroutine for updating a rate of earning reward points that a player qualifies for. For example, process 900 may be carried out essentially concurrently with process 800 (e.g., during a play session of a player). In one embodiment, process 900 may be performed to update the rate of earning reward points that a player qualifies for, the updated rate being determined in step 810 of process 800 and applied in step 815 of process 800.

Process 900 may be performed, for example, on a periodic or non-periodic basis. In one embodiment, process 900 may be performed essentially continuously during a play session of a player. In another embodiment, process 900 may be performed periodically (e.g., each half hour or other interval based on which a player may qualify for an increased rate of earning reward points). In yet another embodiment, process 900 may be performed in response to an occurrence of one or more pre-conditions other than a passage of a time interval. For example, process 900 may be performed after each set of fifty game plays of a player.

In step 905, a current rate of earning reward points that a player qualifies for is determined. For example, the current rate may be retrieved from a memory (e.g., from a record of a play session database or from a record of a player database). In one embodiment, the current rate may be determined by analyzing activity associated with the player for whom the rate is being determined.

Once the current rate is determined, the activity of the player is determined. Determining the activity of the player may comprise, for example, monitoring activity of the player as it occurs. In another embodiment, determining the activity may comprise retrieving data indicating previous activity from a memory.

In step 915 it is determined whether the player qualifies for an increased rate of earning reward points based on the activity determined in step 910. For example, one or more requirements for qualifying for an increased rate of earning reward points may be retrieved from memory and the activity analyzed to determine whether the activity satisfies the one or more requirements.

In a more particular example, assume a player currently qualifies for a rate of 0.2 reward points per game play on which the maximum allowable amount is wagered. Further assume that the player may qualify for an increased rate of 0.4 reward points per game play on which the maximum allowable amount is wagered if the player plays a gaming device (not necessarily a single gaming device) for thirty (30 minutes), with a minimum average rate of play of 150 game plays for the thirty (30) minutes. Further assume that no more than a single interval of a maximum duration of three minutes is allowed to the player during the thirty (30) minute duration in order for the player to qualify for the increased rate of earning reward points. In the present example, step 910 may comprise determining all tracked activity for the player within the past thirty minutes. For example, such tracked activity may be stored in a play session database in association with a player identifier. For example, gaming devices in communication with a device storing the play session database (e.g., controller 110 or a floor controller 125) may communicate all gaming activity associated with a player to the device. In another example, the player activity may be stored in a memory of a gaming device the player is playing. The gaming device may be the device performing the process 900, or portions thereof. Alternately, the gaming device may provide an indication of the activity to another device performing process 900. The tracked activity over the past thirty (30 minutes) may then be compared to the requirements described in the present example, to determine whether the player qualifies for the increased rate of earning reward points. In other words, the player's activity may be analyzed to determine whether the player played a gaming device for the past thirty (30) minutes at an average rate of at least 150 game plays, with no more than a single interval of a maximum duration of three minutes interrupting the duration. If so, it may be determined that the player qualifies for the increased rate of earning 0.4 reward points per each game play on which the maximum allowable wager is placed.

If it is determined that a player qualifies for an increased rate of earning reward points, the increased rate is set to be the current rate in step 920. For example, the increased rate may be set as the current rate associated with the player in a database (e.g., a player database and/or a play session database). Step 920 may further comprise informing the player of the increased rate that the player has qualified for. For example, a message indicating the increased reward rate may be displayed to a player via a display device of a player tracking module or another display device of a gaming device being played by the player. In one embodiment, an indication of a still increased rate that the player may qualify for, and the requirements the player is to satisfy in order to qualify therefore, may also be output to the player.

It should be noted that, in one or more embodiments, a player who desires to have his activity taken into account in determining whether he qualifies for an increased rate of earning reward points may be required to provide a player tracking identifier when performing the activity. A player may so provide a player tracking identifier, for example, by inserting a player tracking card into a player tracking module of a gaming device or providing such a player tracking card to a point-of-sale operator when making a purchase. In such embodiments, each time an activity is determined to have occurred in association with a player identifier (e.g., by being received from a gaming device 115, a floor controller 125, or a point-of-sale terminal), an indication of the activity may be stored in association with the player identifier. For example, if a play session with an associated status of "in progress" is associated with the player identifier for which an indication of activity is received, the indication of the activity may be stored in a record of the play session database. Similarly, if a play session with an associated status of "on hold" is associated with a player identifier for which an indication of an activity is determined, the status of the play session may be changed to "in progress" and the indication of the activity may be stored in the appropriate record of the play session database. If no play session of an appropriate status is determined to be available for the player identifier for which an indication of an activity is received, a new record in the play session database may be opened and the indication of the activity may be stored in the new record. Of course, in one embodiment, an indication of an activity associated with a player identifier may be stored in a memory but not in a play session database. For example, the indication of the activity may be stored in a local memory of a gaming device 115 or floor controller 125, in association with the player identifier.

Other methods of tracking activity associated with a player would be understood by one of ordinary skill in the art. For example, U.S. Pat. No. 6,431,983 to Acres (previously incorporated by reference) describes various methodologies and systems effective for tracking activity of a player.

Figure 10A:
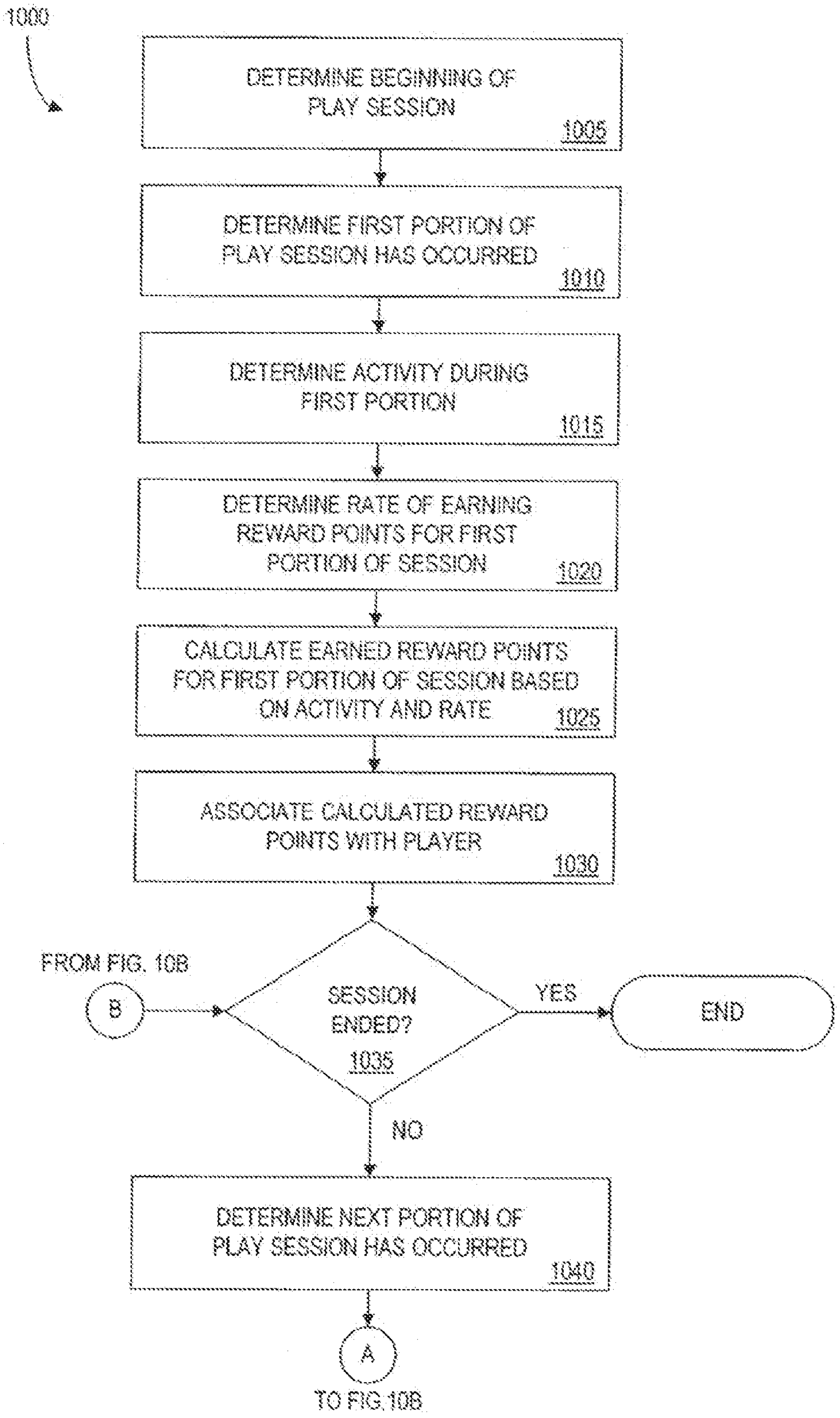
FIGS. 10A and 10B together are a flow chart illustrating an exemplary process according to an embodiment of the present invention.
Figure 10B:
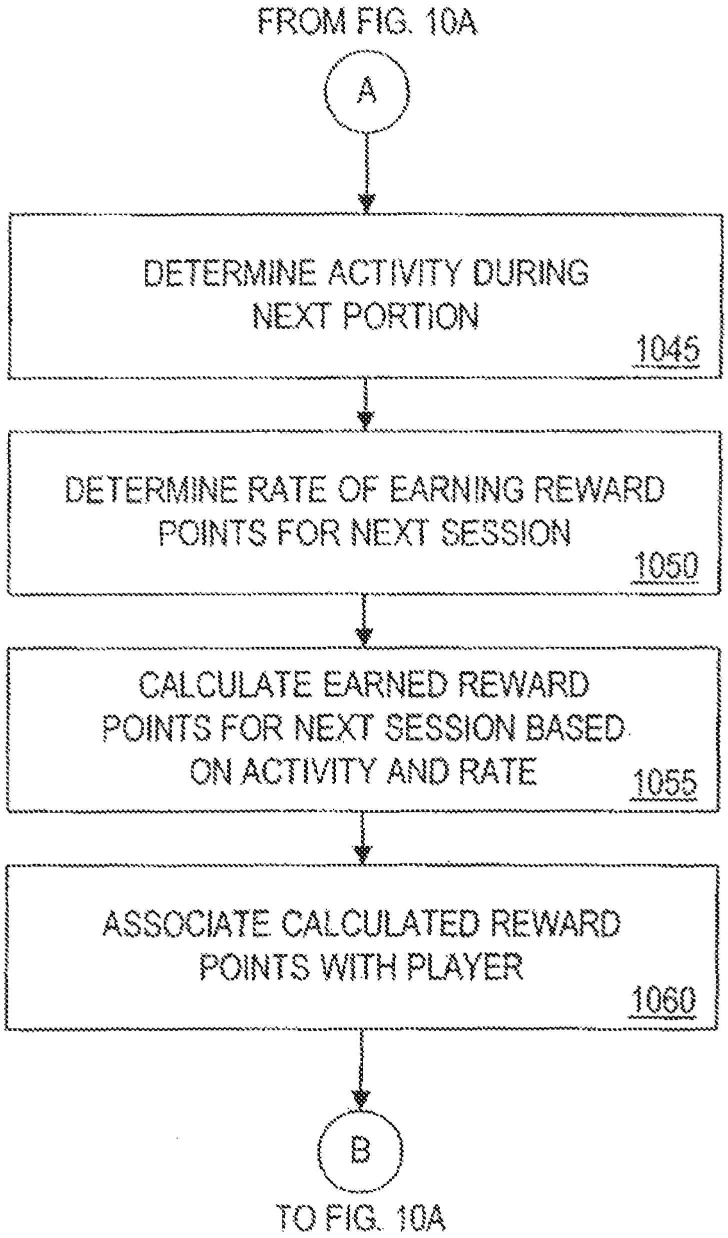

Referring now to FIGS. 10A and 10B, illustrated therein is a process 1000 in accordance with embodiments of the present invention. Process 1000 may be performed, for example, by controller 110, a floor controller 125, a gaming device 115, another device, or a combination thereof. Process 1000 is one example subroutine in which a player's activity is tracked during a play session spent at a gaming device, for purposes of determining a player's eligibility for an increased rate of earning reward points.

In step 1005, it is determined that a player has begun a play session at a gaming device. As previously described herein, since a player's rate of earning reward points may depend in some way on the amount of time spent at a gaming device, it may be desirable to determine a starting point to a player session and/or an ending point to a player session at a gaming device.

In one embodiment, a player's session at a gaming device may be considered to begin when one or more of the following conditions is satisfied:

(i) the player first interacts with a gaming device;

(ii) the player first initiates a game play at the gaming device;

(iii) the player first inserts a player tracking card into the gaming device;

(iv) the player first establishes a credit balance with the gaming device; and (v) the player first sits down at the gaming device (e.g., as determined by a pressure sensor in the seat associated with the gaming device and/or a camera associated with the gaming device).

Accordingly, a gaming device 115 may determine that a play session has begun in response to determining that one or more of the above conditions has been satisfied. In another embodiment, a floor controller 125 and/or controller 110 may determine that a play session has begun in response to determining that an event satisfying one or more of the above conditions has occurred at a gaming device.

In one embodiment, a record in a play session database may be created upon determining that a player has started a play session at a gaming device.

In step 1010, it is determined that a first portion of a play session has occurred. Determining that a first portion of a play session has occurred may comprise, for example, determining that (i) a part of a requirement for qualifying for an increased rate of earning reward points has been satisfied by a player, (ii) an event making a player potentially eligible for an increased rate has occurred, or (iii) another type of predetermined condition has been satisfied.

For example, in one embodiment a player may be eligible to earn increasing rates of earning reward points based on continuous time spent playing a gaming device. In a more particular example, the player may be eligible to earn reward points at a rate of 0.2 reward points per game play for the first thirty minutes of play, a rate of reward points 0.4 reward points per game play for the next thirty minutes of game play, a rate of 0.6 reward points per game play for the next thirty minutes of game play, and so on. In such an embodiment, determining that a first portion of a play session has occurred may comprise determining that the first thirty minutes of play has occurred (e.g., the current time is thirty minutes from the time at which the player began the current play session).

In another embodiment, a player may be eligible to earn increasing rates of earning reward points based on contiguous game plays played at a gaming device. In a more particular example, the player may be eligible to earn reward points at a rate of 0.2 reward points per game play for a first set of one hundred game plays, a rate of 0.4 reward points per game play for a second set of one hundred game plays, a rate of 0.6 reward points per game play for a third set of one hundred game plays, and so on. In such an embodiment, determining that a first portion of a play session has occurred may comprise determining that the first set of one hundred game plays has been completed (e.g., that the game play just completed is the one-hundredth consecutive game play completed from a beginning of the current play session).

In yet another example, a player may be eligible to earn increasing rates of earning reward points based on wagering credits as the number of credits indicated by a credit balance meter approaches zero. For example, a player may establish a balance of 100 credits at a slot machine. Thus, the player may earn one reward point for every credit wagered between a balance of 90 and 100 credits, two reward points for every credit wagered between a balance of 80 and 89 credits, three reward points for every credit wagered between a balance of 70 and 79 credits, and so on, thus motivating players to "play down" an entire balance of credits, rather than cash out before a balance approaches zero (i.e., such that players are motivated to remain gambling longer at a gambling device).

The activity during the first portion is then determined in step 1015. Determining the activity during the first portion of the play session may comprise, for example, determining data associated with the player's gaming activity at the gaming device during the first portion. Examples, of such data include, but are not limited to, data associated with a game play initiated and/or completed during the first portion, such as:

(i) a time at which a game play was initiated and/or completed;

(ii) an amount wagered on a game play;

(iii) a number of game plays played a game play;

(iv) an indication of a payout, if any, that was a result of a game play;

(v) a symbol included in an outcome of a game play;

(vi) an indication of whether a bonus round was qualified for during a game play; and (vii) a strategy employed during a game play (e.g., a hold strategy employed in a video poker game).

In one embodiment, any or all of such data may be determined for each game play initiated or completed during the first portion of the play session. In one embodiment, any or all of such data may be analyzed to determine additional data associated with the first portion of the play session. For example, the time at which each game play was initiated may be analyzed to determine an average rate of play during the first portion or a maximum interval between game plays during the first portion. In one embodiment, any or all of the data enumerated above may be analyzed during the first portion, as it occurs, such that determining the activity during the first portion (step 1015) may comprise determining the analyzed data.

In one embodiment, data associated with the activity may be transmitted from a gaming device at which the play session occurs to another device (e.g., controller 110 or a floor controller 125) during the first portion of the play session. The data may be stored in a memory of the device (e.g., in a play session database) as it is received. In such an embodiment, determining the activity that occurred during the first portion of the play session may comprise retrieving the data from the memory. In another embodiment, the data associated with the activity may be stored locally at the gaming device at which the play session is occurring. In such an embodiment, the gaming device may be queried for the data (or may transmit the data in response to determining that the first portion of the play session has occurred) upon a determination that the first portion of the play session has occurred. In yet another embodiment, the gaming device itself may analyze or utilize the data associated with the activity that occurred during the first portion of the play session. Of course, many other methods of tracking, storing and determining the data associated with the activity that occurred during the first portion of the play session are within the spirit and scope of the present invention.

In step 1020, the rate of earning reward points that is to be applied to the first portion of the play session is determined. For example, in one embodiment the rate associated with a player may be retrieved from a memory (e.g., from a player database or from a play session database). In one embodiment, an identifier of a rate that is associated with a player may be retrieved from memory (e.g., rate "B" may be associated with a player). In such an embodiment, determining the rate may further comprise determining the algorithm that corresponds to the identifier (e.g., it may be determined that rate "B" corresponds to "2 reward points per cherry symbol obtained along a payline" during the first portion of the play session).

In another example, the rate may be determined based at least in part on a status associated with a player (e.g., whether the player is considered a "high roller", "gold status", "premium player", "hotel guest," etc.). For example, if a status of "average player" is associated with a player (e.g., in a player database), a rate of ten (10) reward points per half-hour wagered may be determined as applying to the first portion of the play session, wherein if a status of "premium" player is associated with a player, a rate of twenty (20) reward points per half-hour wagered may be determined as applying to the first portion of the play session. In one embodiment, a default rate is determined as applying for the first portion of a play session of all players (or all players of a particular status).

In yet another example, the rate may be determined at least in part based on the activity that occurred during the first potion of the play session. Accordingly, an increased rate may be applied retroactively to activity that already occurred, if the activity qualifies the player for the increased rate. For example, if a player maintains an average rate of at least 400 game plays per hour during the first session, an increased rate of 0.2 reward points per dollar wagered may be applied to the player's activity during the first portion of the play session, in lieu of a lower rate of 0.1 reward points per dollar wagered.

Once the rate is determined, reward points to be awarded to the player for the first portion of the play session are calculated based on the rate and the activity during the first play session (step 1025). The calculated reward points are associated with the player of the play session in step 1030. In one embodiment, an indication of the calculated and associated reward points may be output to the player.

In one embodiment, process 1000 further includes a step of determining whether the player has qualified for an increased rate of earning reward points (e.g., based on the activity that occurred during the first portion). In another embodiment, such a determination is performed in accordance with another subroutine (e.g., the subroutine of process 900).

In step 1035 it is determined whether the play session has ended. In one embodiment, a player's session at a gaming device may be considered to end when one or more of the following conditions is satisfied:

(i) the player does not initiate a game play at the gaming device for a predetermined amount of time (e.g., for two minutes);

(ii) the player does not interact with a gaming device for a predetermined amount of time. For example, the player does not press a button, insert or withdraw a coin, pull the handle, touch the screen, etc., for a predetermined amount of time;

(iii) the player removes (or requests removal of) a player tracking card or smart card from the gaming device;

(iv) the player's credit balance reaches zero or a predetermined minimum amount; and (v) the player gets out of his seat. Such an event may be detected, for example, by pressure sensors in a seat.

Accordingly, in one embodiment a gaming device 115 may determine that a play session has ended by determining that one or more of the above conditions has been satisfied. In another embodiment, a controller 110 or floor controller 125 may determine that a play session has ended by determining that an event occurring at a gaming device satisfies one or more of the above conditions.

When a session ends, in one embodiment a rate at which reward points are earned may be reset to a default rate. For example, a gaming device may have a default rate of providing reward points of one point per dollar wagered. A player just beginning a session at the gaming device may earn reward points at the default rate. However, as the player continues to play at the gaming device, the gaming device's rate of providing reward points may increase. In another embodiment, a default rate may be associated with a player, irrespective of the gaming device being played by the player.

As described herein, a player may, in one or more embodiments, maintain a current play session even though one of the aforementioned conditions signifying the ending of a play session may be determined to have occurred. For example, a player may wish to use restroom facilities, and may thereby wish to leave a gaming device for a period of a few (e.g., ten) minutes. The gaming device might ordinarily consider the play session to have ended when there has been no activity at the gaming device for five minutes. However, the player may indicate an intention to return to the gaming device within a designated period of time. If the player fulfills this intention, the gaming device may then allow the player to resume his current play session. In one embodiment, the gaming device may even prevent other players from using the gaming device while the player is away from the gaming device, by locking or freezing until the player has returned.

If it is determined that the play session has ended, in one embodiment the process 1000 ends. In one embodiment, the status of a play session may be set to "over" or another appropriate status when it is determined that a player has ended a play session at a gaming device. Otherwise, the process 1000 continues to step 1040.

In step 1040 it is determined that the next portion of the play session has occurred. Determining that the next portion of the play session has occurred may be done in a manner similar to determining that the first portion of the play session has occurred, as described with respect to step 1010. For example, it may be determined that (i) a pre-requisite for the player qualifying for an increased rate of earning reward points, (ii) an event making a player potentially eligible for an increased rate has occurred, or (iii) another type of predetermined condition has been satisfied.

In step 1040 the activity that occurred during the next portion of the play session, determined in step 1035, is determined. Determining the activity during the next portion of the play session may comprise determining the activity in any and all of the manners described with respect to determining the activity that occurred during the first portion of the play session, as described with respect to step 1015.

The rate of earning reward points for the next portion is determined in step 1050. This step, similar to step 1020, may comprise retrieving the rate that corresponds to the player or status of a player from a memory. Any of the manners of determining an appropriate rate described with respect to step 1020 may be utilized to determine the appropriate rate in step 1050. Again, once the appropriate rate is determined, the earned reward points are calculated based on the rate and the activity that occurred during the next portion (step 1055). The calculated reward points are then associated with the player (step 1060) in a manner similar to that described with respect to step 1030. The process 1000 then returns to step 1030, in which it is again determined whether the play session has ended.

It should be noted that although the embodiment described with respect to process 1000 comprises awarding reward points to a player essentially at the end of each portion of a play session, for activity that occurred during the portion, award points may be awarded based on other timing. For example, in one or more embodiments reward points may be awarded throughout portions of the play session (e.g., as a result of each event or activity during each portion of the play session that qualifies for an award of reward points).

Figure 11:
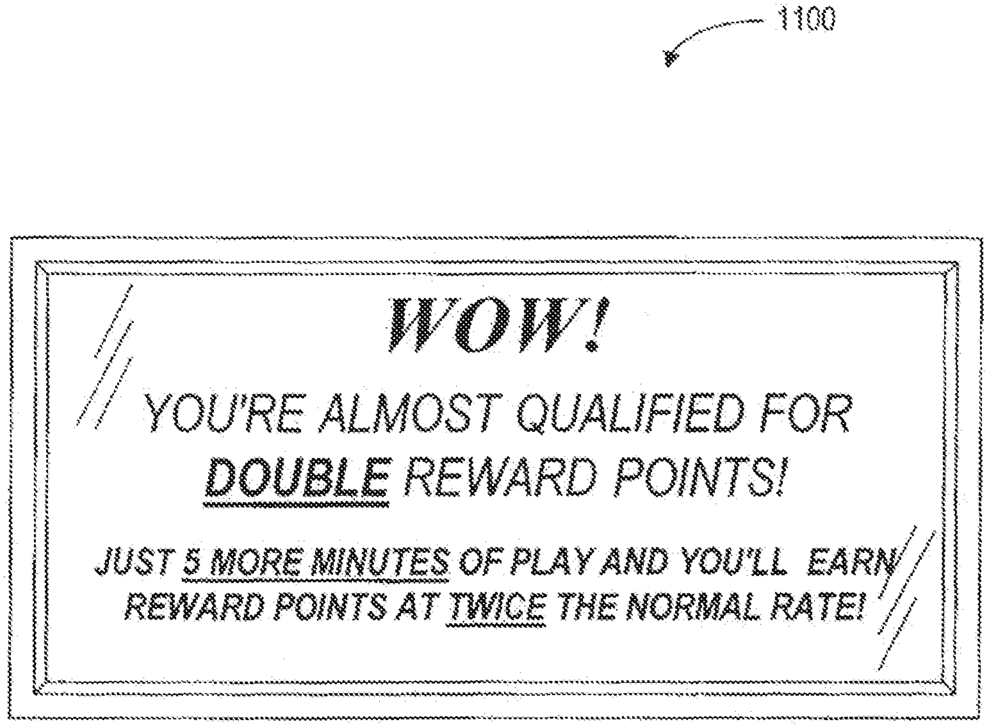
FIG. 11 is a drawing illustrating an example of a display screen that may be displayed to a player of a gaming device, in accordance with one or more embodiments of the present invention.

Referring now to FIG. 11, illustrated therein is an example message that may be output to a player via a display device associated with a gaming device. One example of such a display device is a device of a player tracking module of the gaming device. Another example is a primary or secondary display device of the gaming device that is normally utilized to output game or bonus related information to a player. For example, the iVIEW™ system manufactured by Bally Gaming Systems™ may be an appropriate display via which a message may be output to a player of a gaming device, in accordance with some embodiments of the present invention. The iVIEW™ system combines color, motion and sound with interactive touch-screen technology. It should be noted that a player may respond to one or more such messages, redeem reward points, and otherwise interact with the iVIEW™ or another device implemented in accordance with embodiments of the present invention.

The message illustrated in FIG. 11 comprises a message that informs the player of an increased rate of earning reward points that the player may potentially qualify for. The message further informs the player of activity the player must perform in order to qualify for the increased rate. Such a message may be output to a player in order to motivate the player to continue playing a gaming device, by illustrating to the player how close the player is to earning an increased rate. Other types of messages may be output to a player in accordance with one or more embodiments of the present invention.

In one or more embodiments, if a player is in danger of having a session end, then the gaming device may provide a warning message to the player. For example, if the player has gone for one minute thirty seconds without initiating a game play, the gaming device may output a message on an associated display. Example text of such a message may be: "Your session will end in 30 seconds if you do not initiated another game play!" The gaming device may further describe the consequences of a session ending. For example, the gaming device may output a message of the following text: "You are now earning 3 comp points per game play. If your session ends now, then your rate of earning reward points will revert to 1 point per game play. So please continue and don't let your efforts today go to waste!"

In one or more embodiments, a message output via a display or other output device associated with a gaming device in accordance with embodiments of the present invention may not be directed to a particular player. For example, a gaming device that provides an escalating system of reward points may wish to broadcast or advertise the fact to passing players. Accordingly, a display of the gaming device may show a text message that says, "Earn reward points at a faster rate the longer you play at this machine," or something to that effect. The gaming device may also illustrate a table that shows an independent variable (e.g., time spent at the gaming device) and a corresponding rate of earning reward points. For example, three entries of the displayed table may read as follows:

0-30 minutes: 1 point per dollar wagered 30-60 minutes: 2 points per dollar wagered 60-90 minutes: 3 points per dollar wagered Of course, a gaming device may also output audio messages advertising escalating rates of earning reward points.

As described herein, in one or more embodiments, a gaming device may indicate to a player when he has achieved a new rate of earning reward points. For example, after a player has played at a gaming device for an hour, the gaming device may output a message to the player saying, "Congratulations, you are now earning reward points at the increased rate of two points per dollar wagered, rather than one point per dollar wagered."

In one embodiment, a player may request to view a current rate of earning reward points. For example, a player may press an area on a touch screen of a gaming device labeled "show me my rate of earning reward points". The gaming device may then display the current rate to the player (e.g., "3 reward points per game play").

In one embodiment, a player who has achieved a particular rate of earning reward points may have the ability to trade the rate, transfer the rate, or receive some alternate benefit in exchange for giving up the rate. In one example, a player has earned a rate of three comp points per game play. The player may be tired and wish to leave his gaming device. However, rather than giving up his favorable rate, the player may transfer the rate to his wife or another player. The player's wife may now play at a gaming device (not necessarily the same one as the player), and may earn reward points at a rate of three per game play. In another example, a first player may transfer a rate to another player, while continuing to play and to enjoy the benefit of the rate himself. Thus, a person may earn a rate of 3000 reward points per hour. The person may then designate his friend to receive the same rate of 3000 reward points per hour. The person and his friend may thereafter continue to play while each earns reward points at the rate of 3000 per hour. In another example, a player may earn a rate of four reward points per game play. The casino may then offer the player $20 if the player will give up his rate, so that future play of the player would be at a rate of 2 reward points per game play. Note that the opposite may also occur. Namely, a player may pay in order to have his rate of earning reward points increased, as described above.

In one or more embodiments, a group of players may achieve, through team effort, escalating rates of earning reward points. The rates of earning reward points may depend on global play characteristics of the team, such as:

The total number of hours played by all team members during a particular session (i) the total number of handle pulls made by all team members during a particular play session;

(ii) the total number of "cherry" or other specified symbols obtained by all team members during a particular play session;

(iii) the total number of hours played by at least 80% of team members during a particular play session; and (iv) the total amount wagered by the three team members with the highest individual wager amounts.

With respect to a team embodiment, a play session may be defined in a number of ways. In one embodiment, a play session may refer to any continuous time interval during which there is always at least a predetermined number of team members playing. Thus, a play session may begin when a first team member begins to play, and may end when there are no longer any team members playing. In another embodiment, a play session may be a designated block of time, such as a day or a three-hour period.

When a team achieves a rate of earning reward points, the rate may be applied to each individual on the team such that each individual earns reward points for his personal use at the applicable rate. Alternatively, each individual member's play may cause reward points to be added to a team total of reward points that are to be redeemed by the team as a whole. For example, if a team achieves a rate of earning reward points of four points per game play, then the team as a whole may earn four reward points for each game play played by any team member, the earned reward points being added to a total of reward points associated with the team as a whole. The team as a whole may then, at some future point, decide how to redeem the reward points (e.g., what prize to select). In another example, a rate of four reward points per game play may apply to each individual on a team. Thus, a first individual who makes a relatively large number of game plays will earn more reward points for himself than will another individual on the same team who plays a relatively fewer number of game plays.

In one embodiment, a first member of a team may earn reward points at a different rate than a second member of a team. However, the team's performance as a whole may affect whether/how each individual's rate is increased.

In one or more embodiments, the rate at which a player who is a member of a team earns reward points may depend on the number of fellow team members that are playing at a given time. For example, a player on a team may earn one reward point per game play if he is the only member of his team playing. He may earn two reward points per game play if he and one other member of his team are playing. He may earn three reward points per game play if there are a total of three team members playing, and so on. In some embodiments, the rate at which a team as a whole earns reward points, when measured on a per player per game play basis, may vary as the number of active players varies. For example, if there are two team members playing, then the team may earn two reward points for each game play played by any active player on the team, (i.e., by any team member who is playing). If there are five team members playing, then the team may earn three reward points for each game play played by any active player on the team. The present embodiments may encourage team members to play at the same time, so that each team member and/or the team as a whole earns reward points at a greater rate. The present invention may also encourage team members to play at the same casino at the same time, as a team's play may be tracked only within a given casino.

As described herein, in one or more embodiments, a rate of earning reward points may carry over from one gaming device to another. For example, if a player has achieved a rate of earning four reward points per dollar wagered at a first gaming device, the player may move to a second gaming device and continue to enjoy the same rate. However, in order to continue enjoying the same rate, the player may be required to commence play at the second gaming device within a predetermined time of ceasing play at the first gaming device.

In one or more embodiments, a given rate of earning reward points may vary from gaming device to gaming device. For example, a player may progress from a "silver player" to a "gold player" to a "platinum player" designation. The "platinum player" designation may, for instance, allow the player to earn a first number (e.g., four) reward points per dollar wagered at a fruit slot machine, but only a second, lesser, number (e.g., two) reward points per dollar wagered at a video poker machine. The lower hold percentage at the video poker machine compared to the fruit slot machine, for example, may result in a casino operator being less willing to award as many reward points at a video poker machine than at a fruit slot machine.

It should be noted that although it has been described herein that a player may earn or maintain a rate of earning reward points via performing, continuing to perform, or returning to perform certain activities, in one or more embodiments a player may be allowed to obtain or maintain a rate via another manner. In one embodiment, a player may be allowed to provide payment in one or more forms in exchange for obtaining or maintaining a rate the player would not otherwise be entitled to obtain or maintain. In another embodiment, a player may win a rate the player would not otherwise be entitled to.

For example, in one embodiment a player may have various opportunities to pay for the privilege of maintaining a certain rate of earning reward points, even though the player's session might otherwise be considered to end. For example, a player may pay $3 and may thereby have the opportunity to cease playing for the day. If the player resumes play within twenty-four hours, then the player may resume play at the rate of earning reward points that he obtained the previous day. A player may pay for a rate in a number of ways. Among them, a player may play a certain number of game plays, may buy a hotel room for the night, may eat at the casino's restaurant, or may buy some other product or service from the casino. The player may also agree or commit to do any of the foregoing.

It should be noted that in embodiments in which a player pays for an increased rate of earning reward points, the increased rate may apply for a predetermined number of game plays or for a predetermined period of time (e.g., until the end of a play session, the end of the day, or the end of some other predetermined time period). In accordance with one embodiment, at the end of the predetermined number of game plays or the period of time the player may earn reward points at a lower (e.g., default) rate (e.g., one reward point per game play).

A payment for an increased rate of earning reward points may be structured as the purchase of a membership. For example, a person pays for a membership into a special reward point program. As a member, the person is entitled to earn comps at an increased beginning rate and may further be eligible to qualify for an even more increased rate. For example, membership may allow a person to earn reward points at a rate of one reward point per game play in lieu of a standard rate on any given gaming device, if the standard rate is lower, or at a rate of double the standard rate on any given gaming device. The membership may last for a predetermined period of time, after which, in some embodiments, it may be renewed with an additional membership fee.

Certain players may also be given special privileges based on, for example, the value in which the casino holds them. For example, certain players who are long time customers of the casino, players who have spent a large amount of money at the casino, first time players at the casino, or new members of the casino slot club may be given the privilege of ending a play session and resuming later at the same rate of earning reward points.

In various embodiments, players may win the privilege of maintaining a rate of earning comp points between sessions. For example, a player who obtains an outcome "bar-bar-bar" may be able to leave the gaming device for one hour without losing his rate of earning comp points. In another example, a player who has not otherwise satisfied the requirements of qualifying for an increased rate of earning reward points may win the increased rate as a result of an outcome of a game play or a bonus round.

As described above, increasing rates of earning reward points based on qualifying activities is just one example of how a casino patron may be provided rewards of increasing value.

For example, in one or more embodiments, there may not be an explicit "rate" at which reward points are earned. Rather, a player may earn a number of reward points based on a play session in its entirety. For example, a gaming device may provide a player with: 100 reward points for ten (10) minutes of play; 250 reward points for twenty (20) minutes of play; 450 reward points for thirty (30) minutes of play and so on. However, in such an embodiment an effective rate at which reward points are earned may still be derived. In the above example, the player will effectively earn reward points at a rate of ten (10) points per minute for the first ten (10) minutes, at a rate of fifteen (15) points per minute for the second ten (10) minutes, and at a rate of twenty (20) points per minute for the third ten (10) minutes of a play session.

In another example, a player may earn benefits of increasing value directly rather than earning reward points that may be redeemed for other benefits. For example, as in a cash-back program, players may earn back a percentage of all money wagered. However, in one or more embodiments of the present invention, the percentages earned back may escalate. For instance, a player may earn one cent per dollar wagered during the first half hour of a session, and two cents per dollar wagered thereafter. Benefits may include: cash, gambling credits or tokens, products or services, discounts on products or services, increased payouts at a gaming device, increased probabilities of winning at a gaming device, increased probabilities of entering a bonus round, free or discounted plays at a gaming device, and so on.

In one or more embodiments, players may earn benefits of higher and higher quality as time progresses, or based on some other factor. For example, during a player's first hour of play, a player may earn a free buffet lunch. During a player's second hour of play, he may earn a gourmet dinner. In another example, a player's first two thousand game plays during a play session may earn him a free night's stay in a standard hotel room. A player's second two thousand game plays during the play session may earn him a free night's stay in a suite. Thus, the quality of a benefit awarded to a player may increase or escalate over time.

In one or more embodiments, there be a limit to the rate at which a player may earn reward points, or other benefits. For example, the rate at which a player earns reward points may increase by one point per dollar wagered every half hour. However, once the player is earning six points per dollar wagered, the rate may stay fixed, and the player may continue to earn six points per dollar wagered for the remainder of his play session. This may prevent situations from arising where the player obtains an advantage over the casino. For example, if a rate of earning reward points were to increase indefinitely, a player may eventually earn reward points at such a high rate that the value of the reward points conferred for a given event would exceed the casino's expected profits from the event.

In one or more embodiments, a play session's duration may be limited. For example, a session length may be limited to four hours, after which a rate of earning reward points may revert to a default rate.

In one or more embodiments, a player may earn an escalating rate of receiving reward points that only applies during a subsequent session. For example, after playing for a first hour during a first play session, a player may earn a rate of receiving reward points of two points per dollar wagered. After playing for a second hour during the first play session, the player may earn a rate of three points per dollar wagered. However, the player may not actually be awarded reward points during the first play session at the rate of three points per dollar wagered. Rather, during a second and subsequent play session, the player may be awarded reward points at a rate of three per dollar wagered for activity during the second play session.

In one or more embodiments, a player may earn reward points for play at a gaming device after he leaves the gaming device. For example, a player may play at a gaming device for an hour. The gaming device may record the identity of the player using information stored on the player's tracking card. The gaming device may also record the duration of the player's play session, and various other statistics, such as the total amount wagered during the play session, the total number of game plays made during the play session, the total number of paylines played, and so on. Based on any of the aforementioned, or other statistics, the gaming device may determine a rate of earning reward points that is to apply to the player for subsequent play of the gaming device by another person (e.g., for a predetermined period of time or for a predetermined number of game plays). In this example, the gaming device may determine that the player is to earn reward points at the gaming device at a rate of two per each game play played by any new person who sits down and plays the gaming device after the player has left. Therefore, if the player leaves and a new person sits down and makes three hundred game plays in the next hour, the player will have earned six hundred reward points based on the play of the new person. However, after the hour has ended, the player will no longer be eligible to earn reward points based on further play at the gaming device.

As described, the reward point rate may be determined based on a player's play patterns during the time when he is at a gaming device. As in any of the embodiments described herein, reward point rates may be determined in such a way as to encourage more rapid play, higher wagers, longer durations of a play, and so on. In some embodiments, the longer a player plays at a gaming device, the greater his rate of earning reward points due to the play of subsequent players at the gaming device. In some embodiments, the more game plays a player plays prior to leaving a gaming device, the longer he will earn reward points based on play after he leaves. It will be appreciated that there are many other possible relationships between a player's play at a gaming device, and the rates at which he will earn reward points after he has left the gaming device.

In some embodiments, a player's name may be displayed at a gaming device after the player has left the gaming device. For example, the player's name may be displayed so as to show that the player is still earning reward points based on the play of others. A player's name may disappear after an hour, or at any time when a player is no longer eligible for reward points based on the play of others. Next to a player's name may be listed the number of reward points the player has earned based on the play of others.

In embodiments in which a player may earn reward points based on the play of others, a number of benefits may accrue to a casino operator. First, such a player may encourage others to play a particular gaming device, because such play will benefit the player in terms of earned reward points. Therefore, the casino operator may obtain unofficial salespeople for its gaming devices. The player may even encourage others to make larger wagers, to play more rapidly, and so on, if it means the first player will earn reward points at a higher rate. Secondly, such a player may be encouraged to increase his play at a gaming device, since such increased play may provide him with a better rate of earning reward points or with longer-lasting potential to earn reward points based on the play of others. Third, such a player may try to anticipate the popularity of a gaming device by playing on those he thinks will get a lot of play by others after the player leaves. Therefore, the player may accelerate the process by which a gaming device becomes popular. Fourth, such a player may be encouraged to sample many gaming devices. In this way, he may earn reward points based on the play of others at many different gaming devices. The player may in this way learn about gaming devices that he otherwise might not have sampled.

In some embodiments, a player may play a first gaming device, and then earn reward points based on subsequent play by another person of a second gaming device. For example, a player may earn reward points based on subsequent play by another person of any gaming device in the same pod as the first gaming device.

In one or more embodiments, a player may be presented with an opportunity to achieve a number of "bonus" award points if specific criteria are fulfilled. In some embodiments, bonus reward points may be accrued in addition to standard reward points, which may be based, for example, on a player's wagering activity or number of game plays. For example, it may be determined that in addition to accruing reward points at a rate of 1 point per game play, a player may additionally receive an opportunity to accrue bonus reward points in association with a particular game play. In one embodiment, a display screen of a player tracking module may output a message to a player indicating such eligibility (e.g., "Get a winning outcome on your next spin and win 10 extra reward points!"). Thus, if certain criteria are fulfilled in association with a particular game play (e.g., a player achieves a particular outcome, an outcome comprises a particular symbol, etc.), a player may be awarded a number of reward points.

In conclusion, while the methods and systems of the present invention have been described in terms of particular embodiments, those skilled in the art will recognize that the present invention may be practiced with modification and alteration without departing from the teachings disclosed herein.

The invention is claimed as follows:

1. A gaming system comprising:

a first gaming device including:

at least one first gaming device display device;

at least one first gaming device input device;

at least one first gaming device processor; and at least one first gaming device memory device which stores a plurality of first gaming device instructions which when executed by the at least one first gaming device processor, cause the at least one first gaming device processor to operate with the at least one first gaming device display device and the at least one first gaming device input device to:

(a) enable a first player to initiate at least one play of a first game, (b) for each initiated play of the first game:

(i) randomly generate a game outcome, (ii) display to the first player the randomly generated game outcome, (iii) determine any award associated with the displayed game outcome, and (iv) display to the first player any determined award, and a second gaming device including:

at least one second gaming device display device;

at least one second gaming device input device;

at least one second gaming device processor; and at least one second gaming device memory device which stores a plurality of second gaming device instructions which when executed by the at least one second gaming device processor, cause the at least one second gaming device processor to operate with the at least one second gaming device display device and the at least one second gaming device input device to:

(a) enable a second player to initiate at least one play of a second game, (b) for each initiated play of the second game:

(i) randomly generate a game outcome, (ii) display to the second player the randomly generated game outcome, (iii) determine any award associated with the displayed game outcome, and (iv) display to the second player any determined award, (c) in addition to any determined awards displayed to the second player, determine, based at least in part on at least one activity of the first player, a benefit, and (d) provide the determined benefit to the second player.

2. The gaming system of claim 1, wherein the benefit is a rate of earning reward points.

3. The gaming system of claim 1, wherein the benefit is selected from the group consisting of: a monetary amount, an amount of wagering credits, at least one product, at least one service, at least one discount on at least one product, at least one discount on at least one service, an increased award associated with at least one game outcome for at least one initiated play of the second game, an increased probability of winning at least one award for at least one initiated play of the second game, an increased probability of triggering a bonus game for at least one initiated play of the second game, and at least one free play of the second game.

4. The gaming system of claim 1, wherein the play of at least one of the first game and the second game includes a play of at least one bonus game.

5. The gaming system of claim 1, wherein the play of at least one of the first game and the second game includes a play of at least one wagering game.

6. The gaming system of claim 5, wherein the at least one wagering game is configured to operate upon a placement of at least one monetary wager amount.

7. A method of operating a gaming system, said method comprising:

(a) enabling a first player at a first gaming device to initiate at least one play of a first game, (b) for each initiated play of the first game:

(i) causing at least one processor to execute a plurality of instructions to randomly generate a game outcome, (ii) causing at least one first display device to display to the first player the randomly generated game outcome, (iii) causing the at least one processor to execute the plurality of instructions to determine any award associated with the displayed game outcome, and (iv) causing the at least one first display device to display to the first player any determined award, (c) enabling a second player at a second gaming device to initiate at least one play of a second game, (d) for each initiated play of the second game:

(i) causing the at least one processor to execute the plurality of instructions to randomly generate a game outcome, (ii) causing at least one second display device to display to the second player the randomly generated game outcome, (iii) causing the at least one processor to execute the plurality of instructions to determine any award associated with the displayed game outcome, and (iv) causing the at least one second display device to display to the second player any determined award, (e) in addition to any determined awards displayed to the second player, causing the at least one processor to execute the plurality of instructions to determine, based at least in part on at least one activity of the first player, a benefit, and (f) providing the determined benefit to the second player.

8. The method of claim 7, wherein the benefit is a rate of earning reward points.

9. The method of claim 7, wherein the benefit is selected from the group consisting of: a monetary amount, an amount of wagering credits, at least one product, at least one service, at least one discount on at least one product, at least one discount on at least one service, an increased award associated with at least one game outcome for at least one initiated play of the second game, an increased probability of winning at least one award for at least one initiated play of the second game, an increased probability of triggering a bonus game for at least one initiated play of the second game, and at least one free play of the second game.

10. The method of claim 7, wherein the play of at least one of the first game and the second game includes a play of at least one bonus game.

11. The method of claim 7, wherein the play of at least one of the first game and the second game includes a play of at least one wagering game.

12. The method of claim 11, wherein the at least one wagering game is configured to operate upon a placement of at least one monetary wager amount.

13. The method of claim 11, which is provided through a data network.

14. The method of claim 13, wherein the data network is an internet.

* * * * *